(12) United States Patent
Hamming

(10) Patent No.: US 7,342,745 B2
(45) Date of Patent: Mar. 11, 2008

(54) CARTRIDGE CARRIER

(75) Inventor: John Anthony Hamming, San Clemente, CA (US)

(73) Assignee: Certance, LLC, Costa Mesa, CA (US)

( * ) Notice: Subject to any disclaimer, the term of this patent is extended or adjusted under 35 U.S.C. 154(b) by 358 days.

(21) Appl. No.: 11/137,882

(22) Filed: May 25, 2005

(65) Prior Publication Data

US 2006/0215301 A1 Sep. 28, 2006

Related U.S. Application Data

(63) Continuation-in-part of application No. 10/940,111, filed on Sep. 13, 2004.

(51) Int. Cl.
*G11B 5/016* (2006.01)

(52) U.S. Cl. .................................. 360/99.07

(58) Field of Classification Search ...................... None
See application file for complete search history.

(56) References Cited

U.S. PATENT DOCUMENTS

| | | | |
|---|---|---|---|
| 5,684,777 A * | 11/1997 | Fukuyama et al. ......... 720/635 |
| 5,917,795 A * | 6/1999 | Furukawa et al. .......... 720/635 |
| 5,989,045 A | 11/1999 | Kimura |
| 6,064,548 A * | 5/2000 | Nicklos .................... 360/99.02 |
| 6,295,180 B1 | 9/2001 | Sawada |
| 6,540,528 B2 | 4/2003 | Brodsky |
| 6,545,865 B2 | 4/2003 | Albrecht et al. |
| 6,546,495 B1 * | 4/2003 | Shimura et al. ............ 713/300 |
| 6,722,895 B1 | 4/2004 | Brodsky |
| 6,771,448 B2 | 8/2004 | Blair |
| 2004/0169996 A1 | 9/2004 | Paul et al. |

* cited by examiner

*Primary Examiner*—William Korzuch
*Assistant Examiner*—Mark Blouin
(74) *Attorney, Agent, or Firm*—Mark J. Spolyar

(57) ABSTRACT

A cartridge carrier has a base having a recessed plate, a top surface, and a bottom surface, an interposer board coupled to the base at the top surface, a motorized eject mechanism coupled to the interposer board and the base, a slider plate coupled to the base at the bottom surface and the motorized eject mechanism, and a button bar coupled to the base at the bottom surface, the button bar having a switch tab to contact the motorized eject mechanism.

9 Claims, 22 Drawing Sheets

CARTRIDGE CARRIER

CROSS-REFERENCE TO RELATED APPLICATION

This application is a continuation-in-part of co-pending application Ser. No. 10/940,111, entitled "Cartridge Carrier" by inventor John Anthony Hamming, filed on Sep. 13, 2004.

FIELD OF THE INVENTION

The present invention relates to hard disc drives. More particularly, the present invention relates to a carrier to accept hard disc drives housed in a cartridge.

BACKGROUND OF THE INVENTION

As the value and use of information increases, individuals and businesses seek additional ways to process and store information. One option is the use of removable cartridge. With the advent of personal computers and workstations, it is often necessary to remove the medium on which computer data is stored. A user may desire to remove a storage medium to carry it to a different site and/or a different computer system. It may also be desirable to remove the storage medium to a secure location when the stored computer data is sensitive, secret, or a back-up copy is needed.

Removable hard disc drives are typically housed in a larger shell or cartridge having isolating materials to protect the disc drive in case of a free fall onto a hard surface. Thus, a cartridge 100 (FIG. 1) may be a ruggedized container that houses a hard disc drive. The cartridge is then connected to a larger computer system or network via a carrier inserted into a desktop or server system. The carrier may also be removable from the desktop or server system on an as needed basis. Either the original carrier is reinserted or a different carrier can be inserted back into the desktop or server. This insertion/removal cycle of the carrier may occur several times throughout the work day.

Each time the chassis is inserted into the desktop or server system, it must be electrically interconnected with the host computer by way of a plurality of interfaces connectors. Currently, a ribbon cable runs from the disc drive to terminate at a disc drive interface connector which must be mechanically coupled to a complementary disc drive interface connector within the carrier. Thus, the repeated connect/disconnect cycles of the chassis as well as the connect/disconnect cycles between the removable hard disc drive and the chassis results in the wearing of parts such as connectors. It is desirable to have a chassis that is able to provide power and data signals from the system to the hard disc drive that is able to withstand wear.

BRIEF DESCRIPTION OF THE INVENTION

A cartridge carrier has a base having a recessed plate, a top surface, and a bottom surface, an interposer board coupled to the base at the top surface, a motorized eject mechanism coupled to the interposer board and the base, a slider plate coupled to the base at the bottom surface and the motorized eject mechanism, and a button bar coupled to the base at the bottom surface, the button bar having a switch tab to contact the motorized eject mechanism.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION OF PREFERRED EMBODIMENT

Embodiments are described herein in the context of a cartridge carrier. Those of ordinary skill in the art will realize that the following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
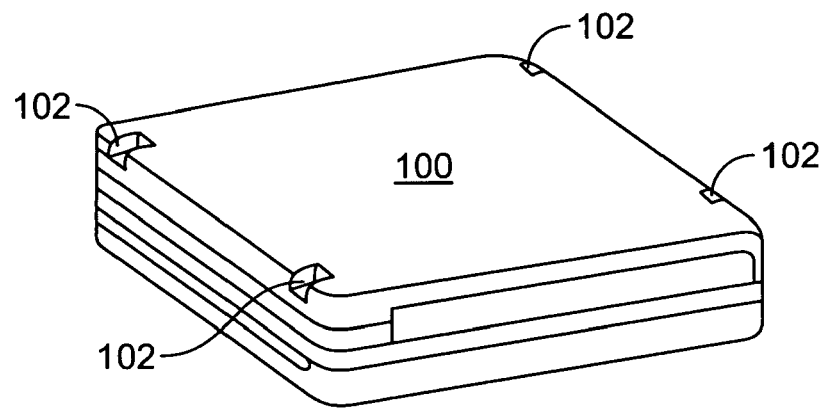
FIG. 1 illustrates an embodiment of a removable cartridge.

FIG. 1 illustrates an embodiment of a removable cartridge. The cartridge 100 may be any shape or size necessary for its use. The cartridge 100 may have notches 102 and orientation tab channel 104 to assist in the positioning of the cartridge 100 in the carrier and to notify a user that the cartridge 100 is properly inserted into the carrier.

Figure 2A:
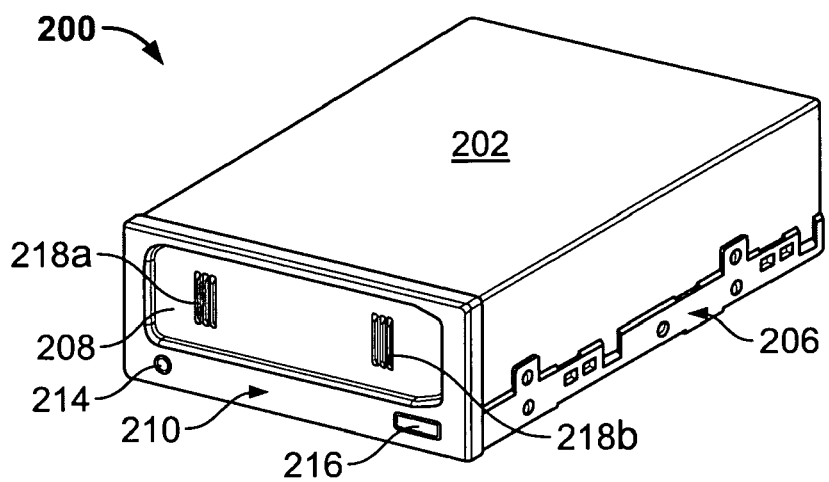
FIGS. 2A and 2B illustrate an embodiment of a cartridge carrier.
Figure 2B:
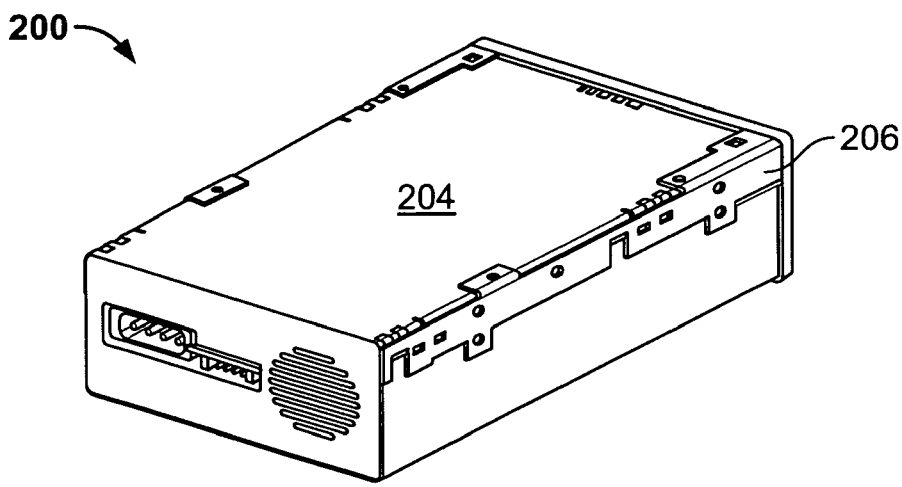

Referring now to FIGS. 2A and 2B, diagrams of an embodiment of a cartridge carrier. The cartridge carrier, generally numbered 200, may have a top cover 202, a bottom cover 204, and a base 206 thereby forming an enclosure. The base 206 connects the bottom cover 204 and the top cover 202 and is positioned within the enclosure.

The carrier 200 may be designed to fit into a 3.5 inch form factor for installation into a desktop or server box bay. The carrier may be made of any dimensions necessary, but may have an outside dimension of about between 90-110 mm width, 30-50 mm height, and about 130-190 mm length.

The carrier may have an opening assembly 210 to provide access to the enclosure and to guide the cartridge 100 into the carrier. The opening assembly 210 may have a door 208, a light pipe opening 214, and an eject button 216. The opening assembly 210 may be contoured to the profile of the carrier 200, and may be larger in height and width than the carrier 200. The opening assembly 210 may be removably connected to the carrier 200 by any means such as snap fit, friction fit, attached with an adhesive, and the like. The door 208 may be designed to be spring closed when a cartridge is not present and may contain a plurality of risers 218a, 218b to contact the cartridge 100. The ridges reduce wear marks on the door and the cartridge 100.

Figure 3A:
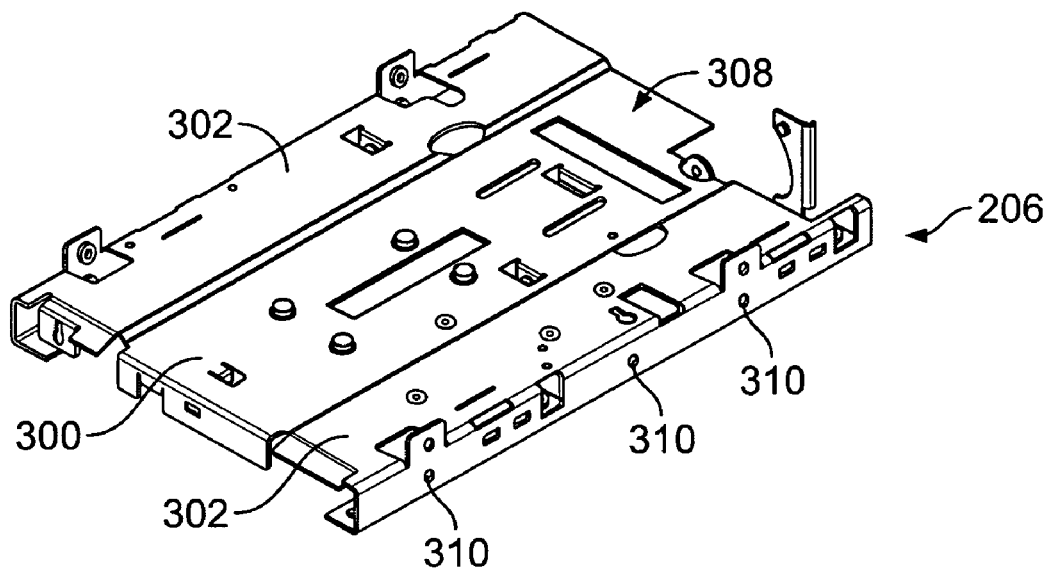
FIGS. 3A and 3B illustrate an embodiment of the base.
Figure 3B:
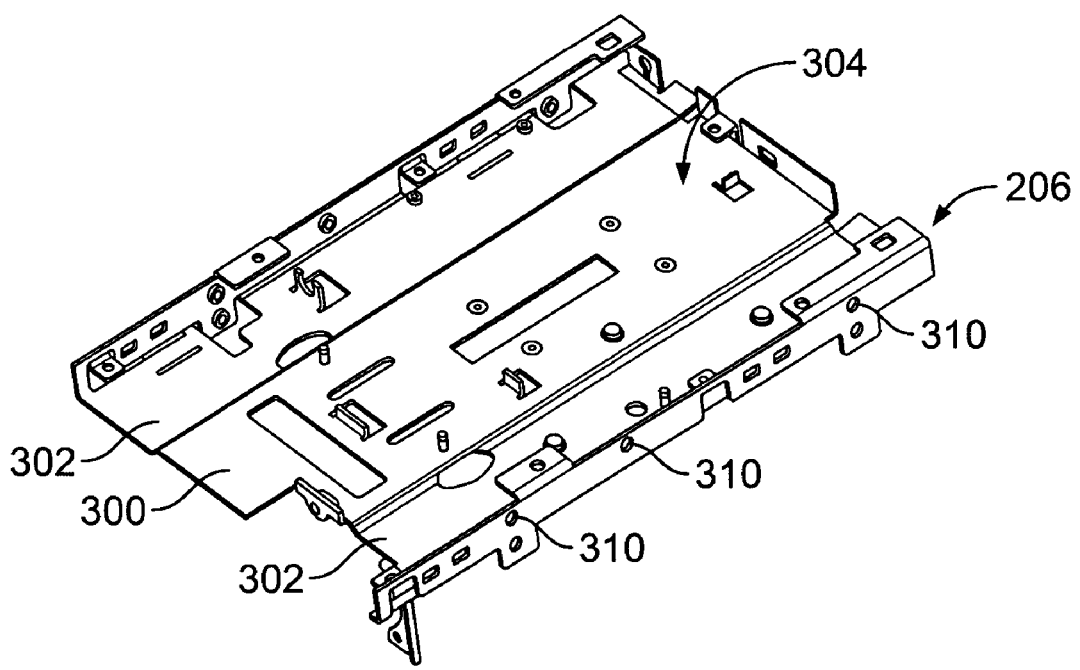

An embodiment of the base 206 is illustrated in FIGS. 3A and 3B. The base 206 has a top surface 308, a bottom surface 304, and a recessed plate 300. The recessed plate 300 may be positioned between two co-planar plates 302 whereby the recessed plate 300 and the two co-planar plates 302 are oriented on different planes. The base 206 may also have a plurality of mounting holes 310 along the sides and bottom surfaces to attach the carrier 200 to a desktop or server bay.

Figure 4:
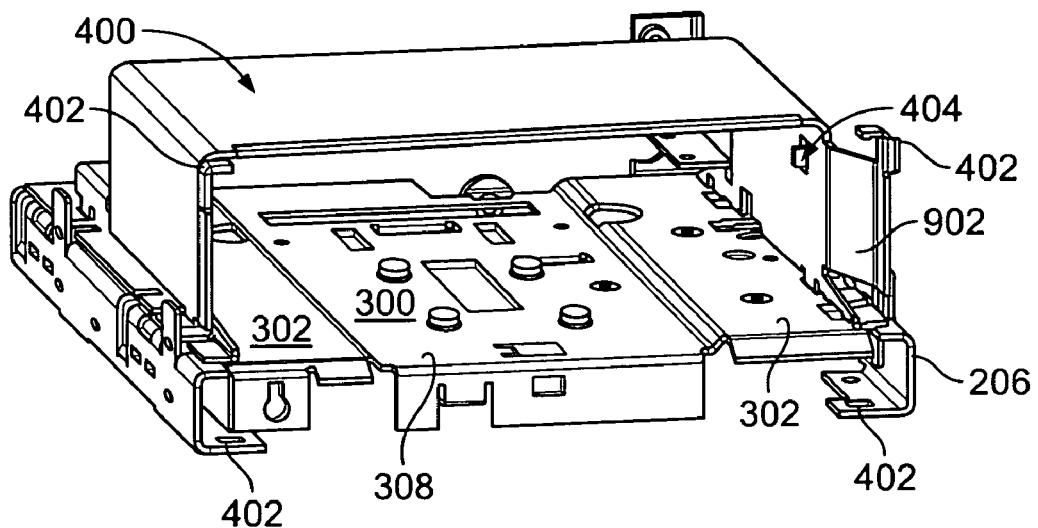
FIG. 4 illustrates an embodiment of a cartridge guide.

FIG. 4 illustrates an embodiment of a cartridge guide. A cartridge guide, generally numbered 400, may be coupled to the top surface 308 of the base 206 to receive the cartridge. The cartridge guide 400 may be removably connected to the opening assembly 210 through a variety of means such as the use of a plurality of assembly mates 402 to mate with the opening assembly. However, the opening assembly may also be connected to the cartridge guide 400 with screws, adhesives, and the like. At least one orientation tab 404 may be positioned within of the cartridge guide 400 to prevent improper insertion of the cartridge into the carrier. The orientation tab 404 may mate with and slide along orientation tab channel 104. Additionally, the disc guide 400 may have mounting holes or mating features in the rear to connect with electronics and/or printed circuit boards (PCBs).

The base 206 and guide parts, such as the orientation tab 404 and cartridge guide 400 itself, are in sliding contact with the cartridge during insertion or loading and extraction or ejection of the cartridge. The cartridge may be guided by the two co-planar top surfaces 302, the base 206, and the inside surfaces of the cartridge guide 400. Thus, to provide a smooth and low friction surface, these surfaces may be treated with hot-dipped galvanized Teflon coating, and the like. Both the base 206 and the cartridge guide 400 may be made of any light but strong material such as sheet metal, plastic, aluminum, and the like.

Figure 5A:
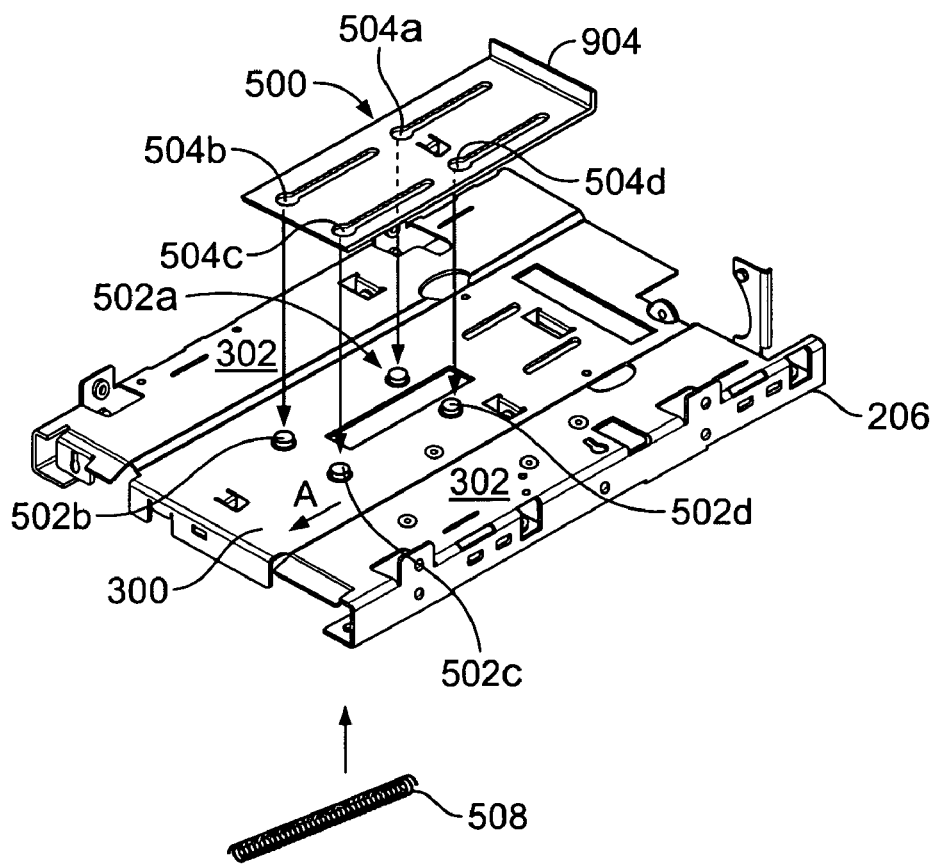
FIGS. 5A-5E illustrate an embodiment of an ejection mechanism.
Figure 5B:
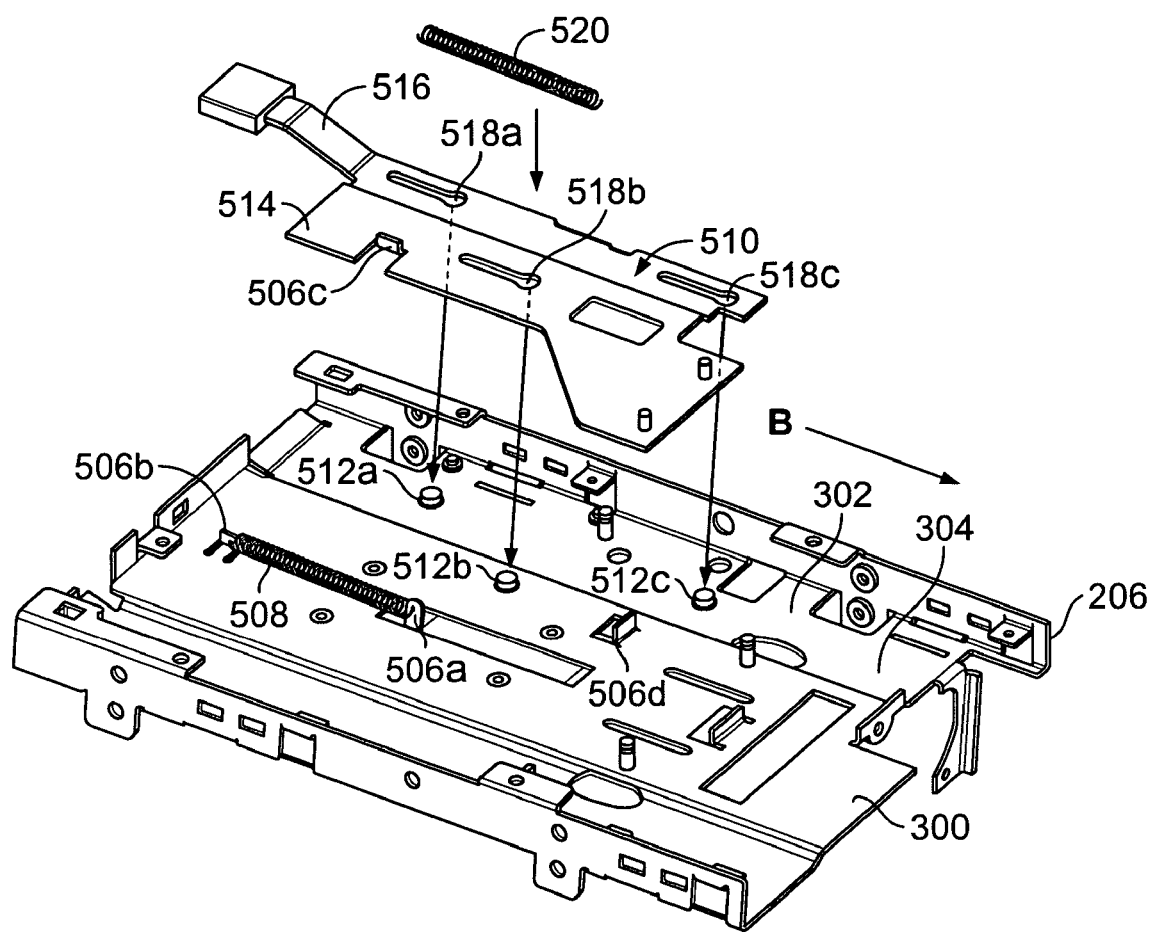

FIGS. 5A-5E illustrate an embodiment of an ejection mechanism. The ejection mechanism has a spring plate 500 connected to the base 206 within the recessed plate 300. The spring plate assists in the ejection of the cartridge from the carrier as will be described in detail below. The spring plate 500 has cartridge contact member 904 to contact the cartridge when inserted into the carrier. Four rivets 502a, 502b, 502c, 502d, on the top surface of the recessed plate 300, receive and guide the spring plate 500. The heads of the rivets 502a, 502b, 502c, 502d may be positioned below the plane of the two co-planar plates 302 to prevent contact with the cartridge. The spring plate 500 is assembled onto the recessed plate 300 by aligning corresponding openings 504a, 504b, 504c, 504d with the rivets 502a, 502b, 502c, 502d. The spring plate 500 is then slid in the direction of arrow A. Once the spring plate 500 is secured, an extension spring 508 is positioned on spring tabs 506a, 506b on the underside of the spring plate 500 and bottom surface of the base 206, respectively, as illustrated in FIG. 5B.

A slider plate 510 is positioned on the bottom surface 304 of the base 206 with a first portion 514 positioned on the recessed plate 300 and a second portion 516 positioned on one of the co-planar plates 302. The slider plate 510 assists in the insertion and ejection of the cartridge as will be described in detail below. The first portion 514 is positioned in a different plane than second portion 516 to conform with the recessed plate 300 and the co-planar plate 302, respectively. Three rivets 512a, 512b, 512c on the bottom surface 304 receive and guide the slider plate 510. The slider plate 510 is assembled onto the base 206 by aligning corresponding openings 518a, 518b, 518c with rivets 512a, 512b, 512c. The slider plate 510 is then slid in the direction of arrow B. Once the slider plate 510 is secured on the base 206, an extension spring 520 is positioned on spring tabs 506c, 506d on the slider plate 510 and base 206, respectively (also illustrated in FIG. 5C).

Figure 5C:
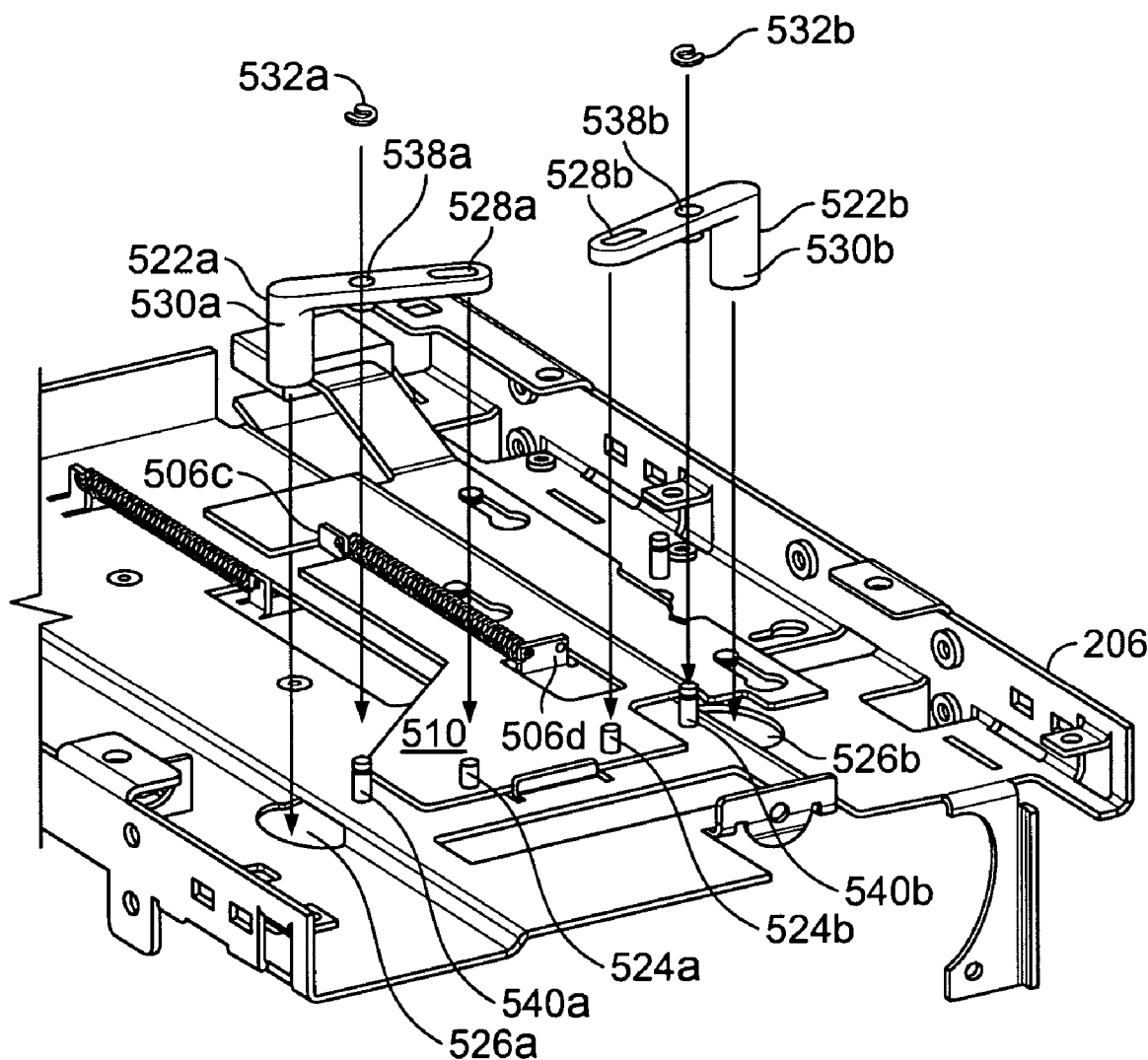

Kick-out levers 522a, 522b, as illustrated in FIG. 5C, may be used to assist in the extraction of the cartridge as further described below. Kick-out levers 522a, 522b may have a first aperture 528a, 528b to be received by pins 524a, 524b on the slider plate 510. A second aperture 538a, 538b may be positioned over pins 540a, 540b on the base 206. Extension members 530a, 530b extend through apertures 526a, 526b on the base 206 to contact the cartridge when inserted into the carrier. Once properly positioned, the kick-out levers 522a, 522b may be held in place by retaining rings 532a, 532b which fit into grooves on pins 540a, 540b. Pins 526a, 526b, and 540a, 540b may have a height greater than the height of the kick-out levers 522a, 522b such that pins 526a, 526b, and 540a, 540b extend outwardly from the kick-out levers 522a, 522b. This allow for the insertion of the retaining rings 532a, 532b on the grooves of pins 540a, 540b. Retaining rings 532a, 532b may be any type of securing ring that is able to secure the kick-out levers 522a, 522b, such as O-rings.

Figure 5D:
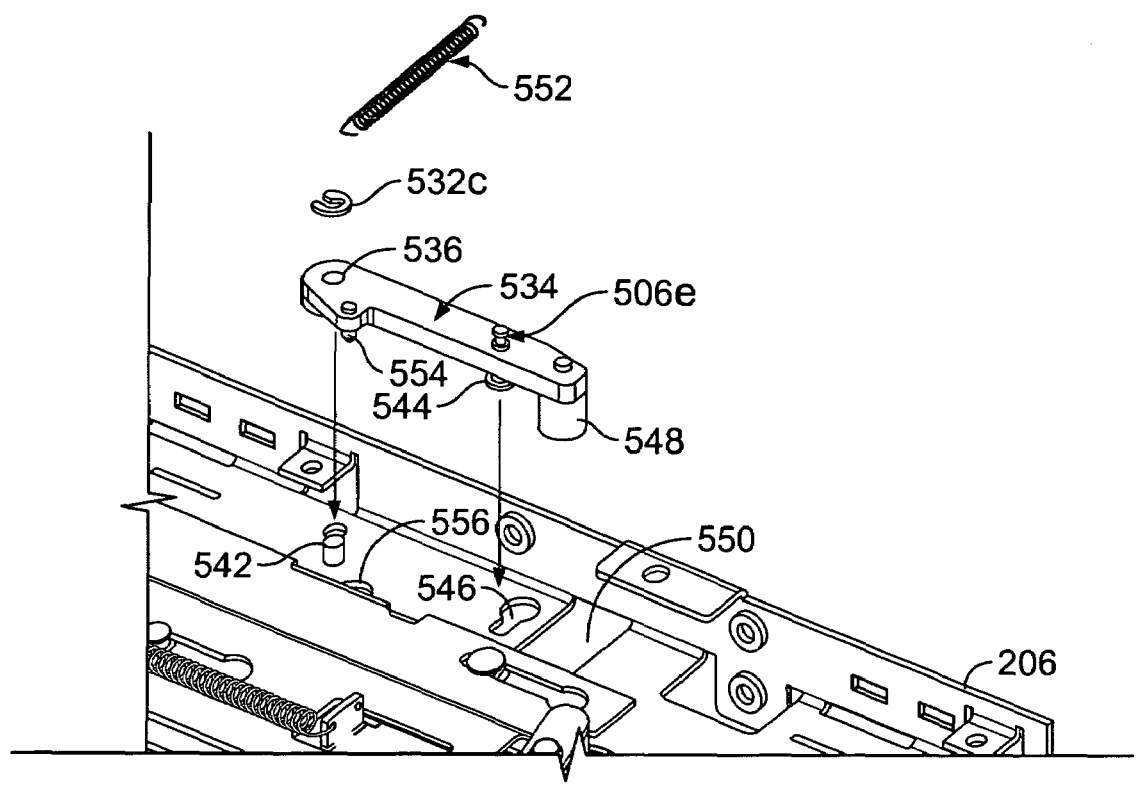
Figure 5E:
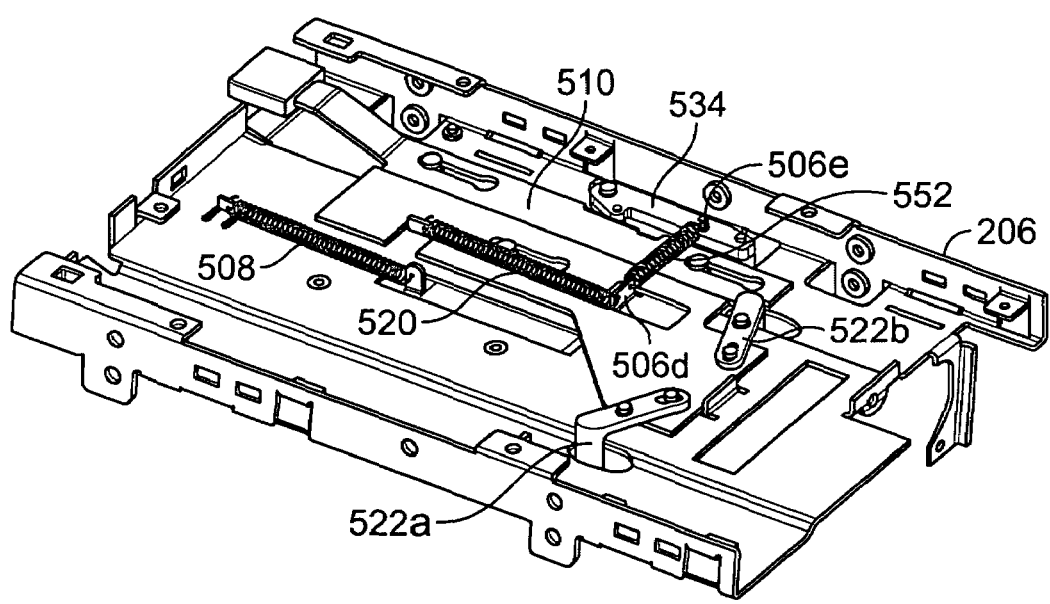

The ejection mechanism may also have a lever assembly 534 as illustrated in FIG. 5D. The lever assembly 534 may have an aperture 536 to mate with pin 542 and may be held in position with retaining ring 532c that fits into a groove on pin 542. A rivet 544 may extend downwardly on the lever assembly 534 such that it may be received by aperture 546. A roller 548 extending downwardly from the lever assembly 534 may be received by aperture 550 on the base 206. The roller 548 contacts the cartridge as it is inserted into the carrier and connects with cartridge notch 102. The lever assembly 534 may be in movable communication with the slider plate 510 through follower pin 554, which is inserted into a cam surface notch 556 on the slider plate 510. Once assembled, an extension spring 552 may be connected to the lever assembly 534 at spring tab 506e and to the spring tab 506d on the base 206 as illustrated in FIG. 5E.

The materials for all moving components discussed above may be made from materials which withstand wear and friction. For example, rivets 502a, 502b, 502c, 502d, 512a, 512b, 512c, 544 may be made from a soft stainless steel, the spring plate 500 and slider plate 510 may be made of polished stainless steel or aluminum, kick-out levers 522a, 522b may be made of injected molded plastic or zinc die cast, lever assembly 534 may be made of brass or Teflon-coated aluminum, and roller 548 may be made of brass or lubricated plastic. The examples above are for exemplary purposes only and not intended to be limiting as numerous other alternatives are possible.

Figure 6A:
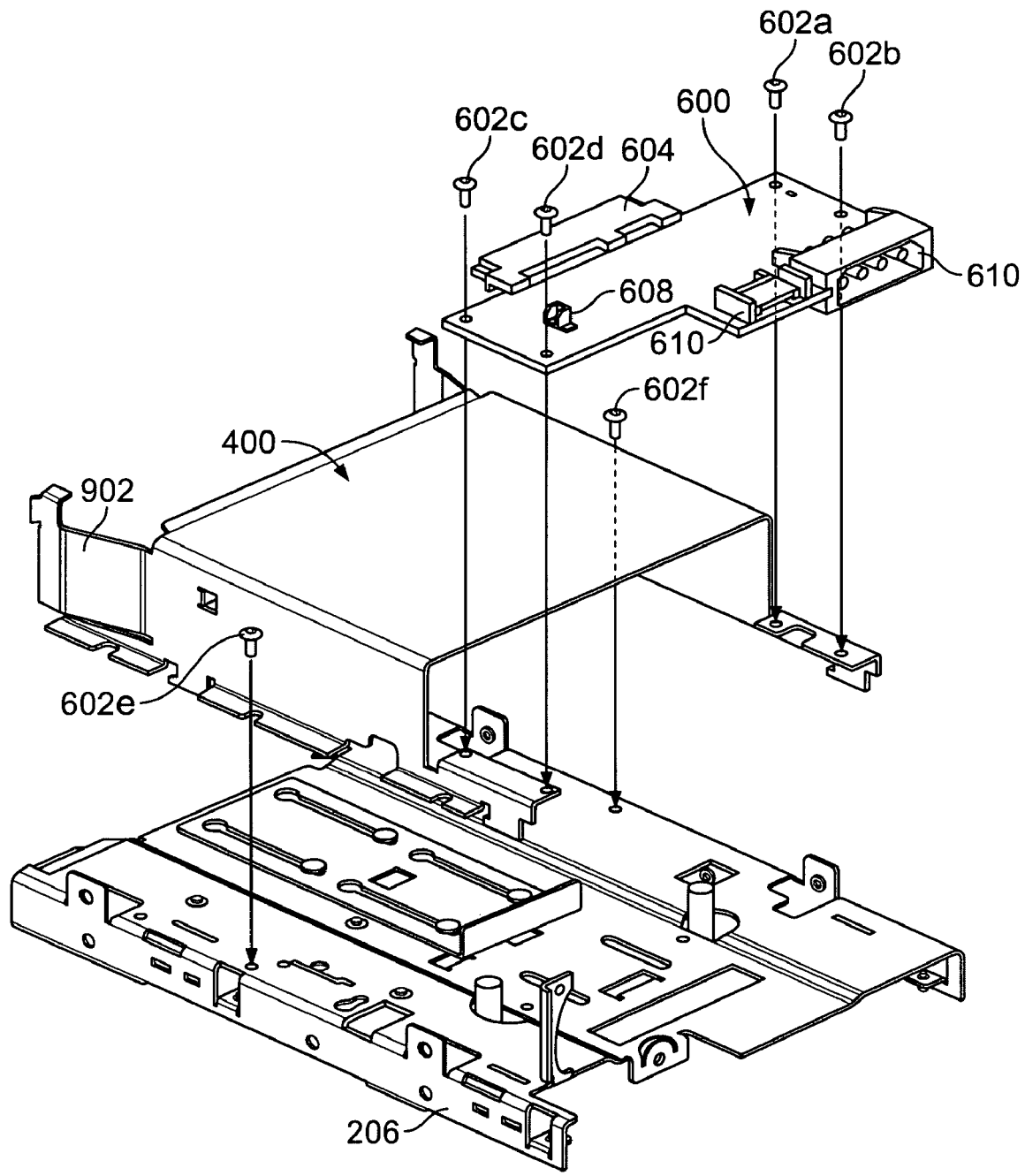
FIGS. 6A and 6B illustrate an embodiment of an interposer board.
Figure 6B:
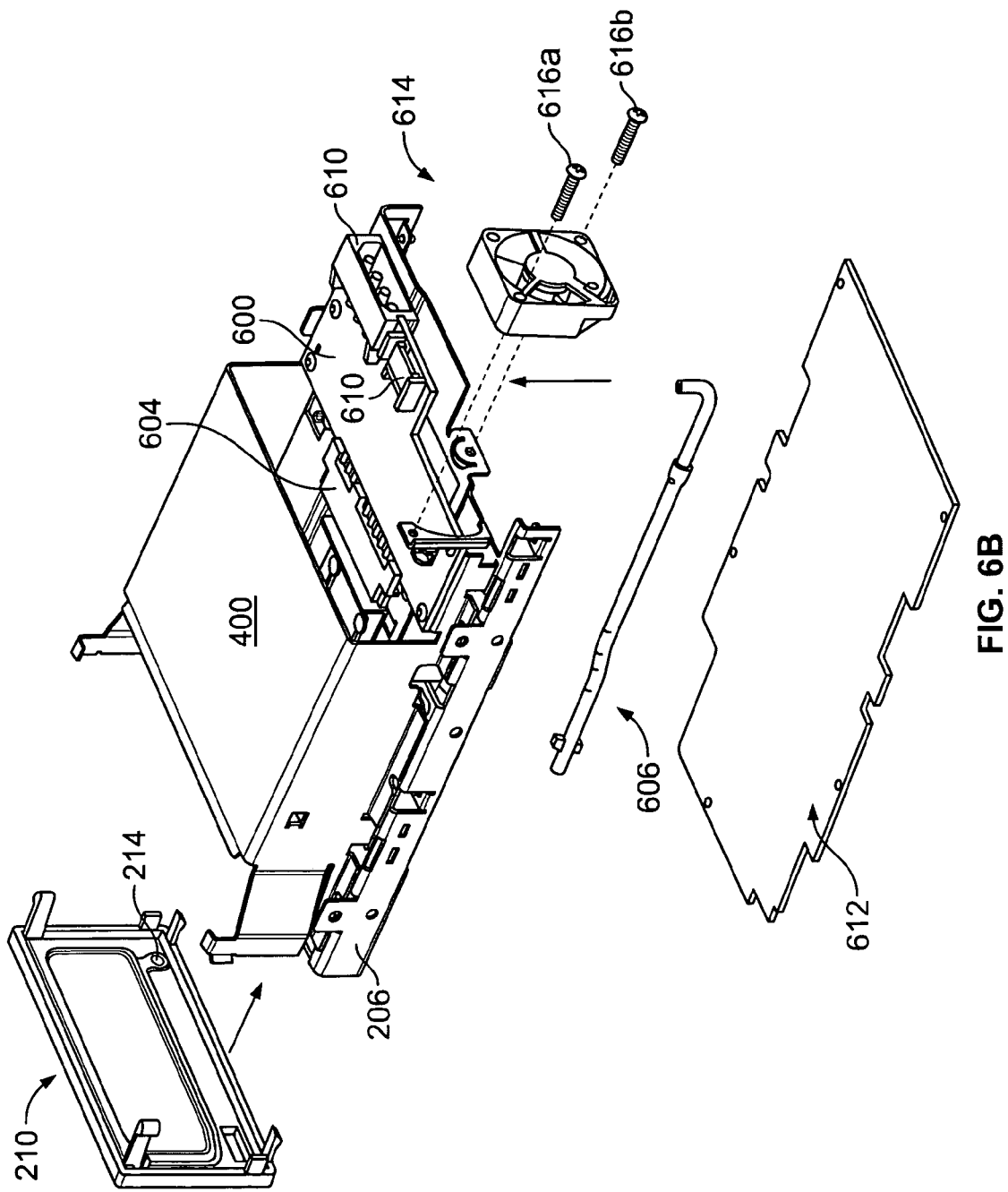

FIGS. 6A and 6B illustrate an embodiment of an interposer board to interface with the cartridge connector. The connection may be achieved by part tolerance or by manufacturing fixtures. An interposer board or PCB 600 may be mounted to the rear of the disc guide 400 with screws 602a, 602b, 602c, 602d. As further illustrated in FIG. 6A, the disc guide 400 may be mounted to base 206 with screws 602e, 602f. The interposer board 600 may contain a mating serial ATA (SATA) connector 604 to mate with the cartridge, various alternative electronics (not shown), a light pipe 606, fan connector 608, and power and signal connectors 610. The figures are illustrated with one embodiment of an interposer board 600, however, the interposer board 600 may be configured in any way necessary. For example, an outside connectivity may require a common 12V/5V connector and a 7 pin SATA signal connector, there may be requirements for a universal serial board (USB) interface, or there may be a combined SATA signal and power connector. Furthermore, the interposer board 600 may have voltage regulators to go from 5V to 3.3V, bridge electronics for USB to SATA, additional connectors to connect to additional PCBs, and the like. As such, the configuration of the interposer board may be varied as necessary. Moreover, although the interposer board 600 is illustrated as horizontally oriented to allow for maximum airflow through the carrier, the interposer board may be oriented in any direction as may be necessary.

As illustrated in FIG. 6B, another or an optional PCB 612 may also be connected to the base 206. The base 206 may be designed to support the larger PCB on the bottom surface. The additional PCB 612 may be used for any reason such as data compression. A fan 614 may also be used to further maximize air flow through the carrier. The fan 614 may be mounted to the base 206 with screws 616a, 616b and connected to the interposer board 600 for power. A light pipe 606 may also be attached to the bottom surface of the base 206. A first end 620 of the light pipe 606 may be located beneath an LED on the interposer board 600 and the second end 622 may be located to fit into the light pipe opening 214 in the opening assembly 210.

Figure 7:
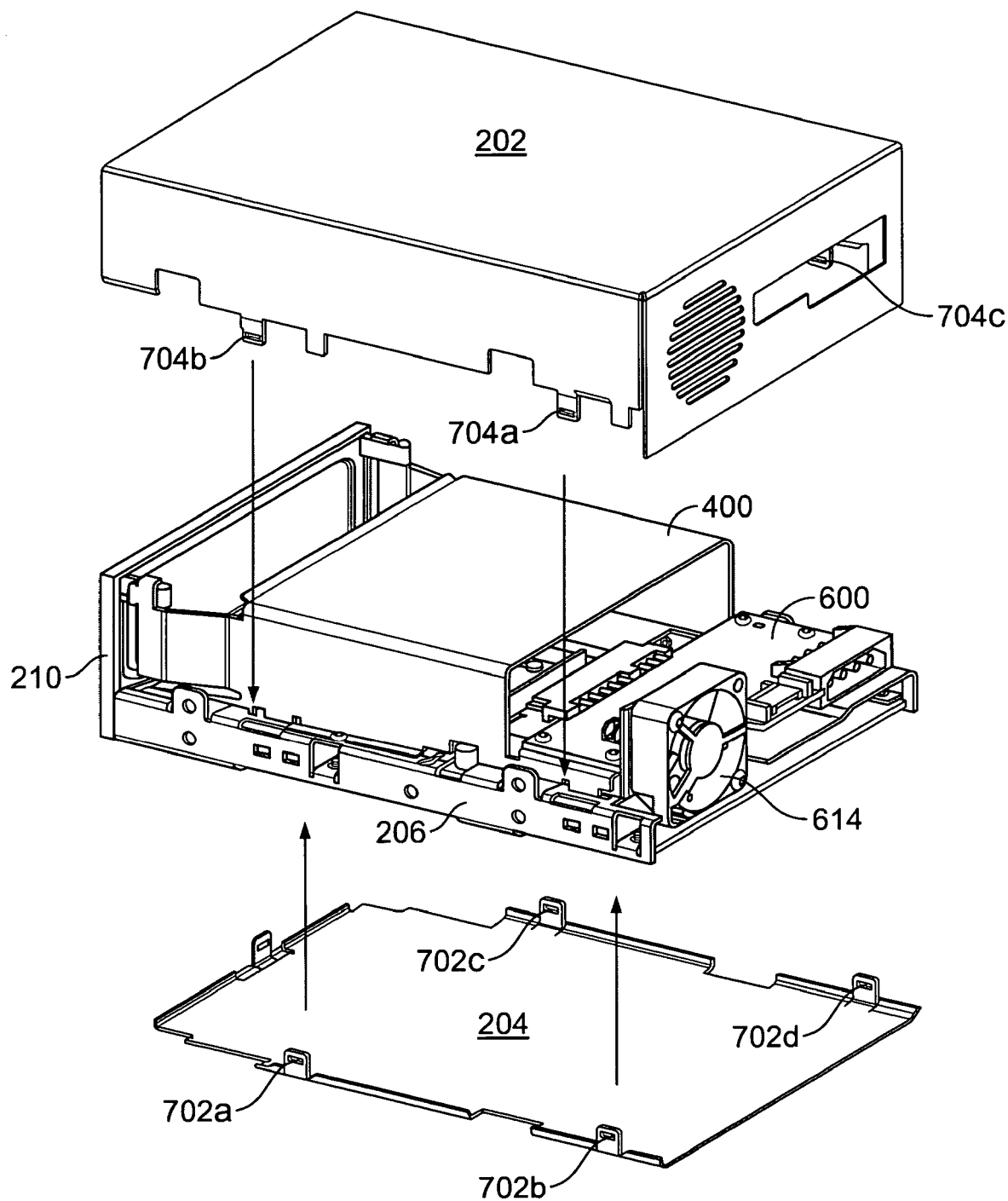
FIG. 7 illustrates a method to assemble the carrier.

FIG. 7 illustrates a method to assemble the carrier. To assemble the carrier 200, the cartridge guide 400 and interposer board 600 are attached to the base 206. A fan 614 may be attached to the base 206 and interposer board 600. The opening assembly 210 may also be attached to the base 206. The top cover 202 and bottom cover 204 may then be fitted together by any means such as a with snap fit tabs 702a, 702b, 702c, 702d, 704a, 704b, 704d that mate with the base 206. However, any other means to attach the top cover 202 and the bottom cover 204 to the base 206 may be used such as adhesives, screws, and the like. The top cover 202 and the bottom cover 204 protect the base and other internal parts during transportation, handling, or shipping.

Figure 8A:
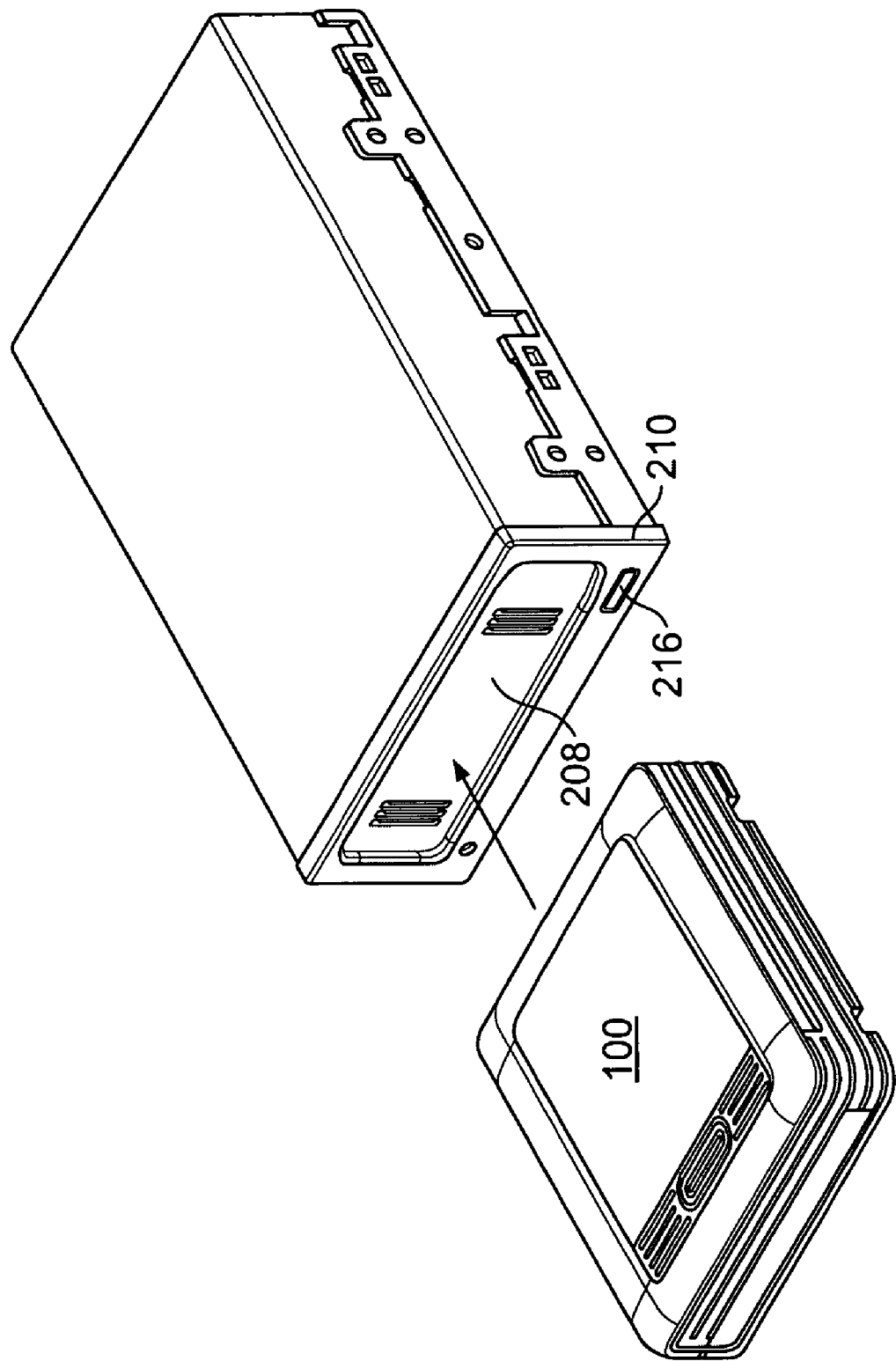
FIGS. 8A-8C illustrates an embodiment of the carrier when not in use.
Figure 8B:
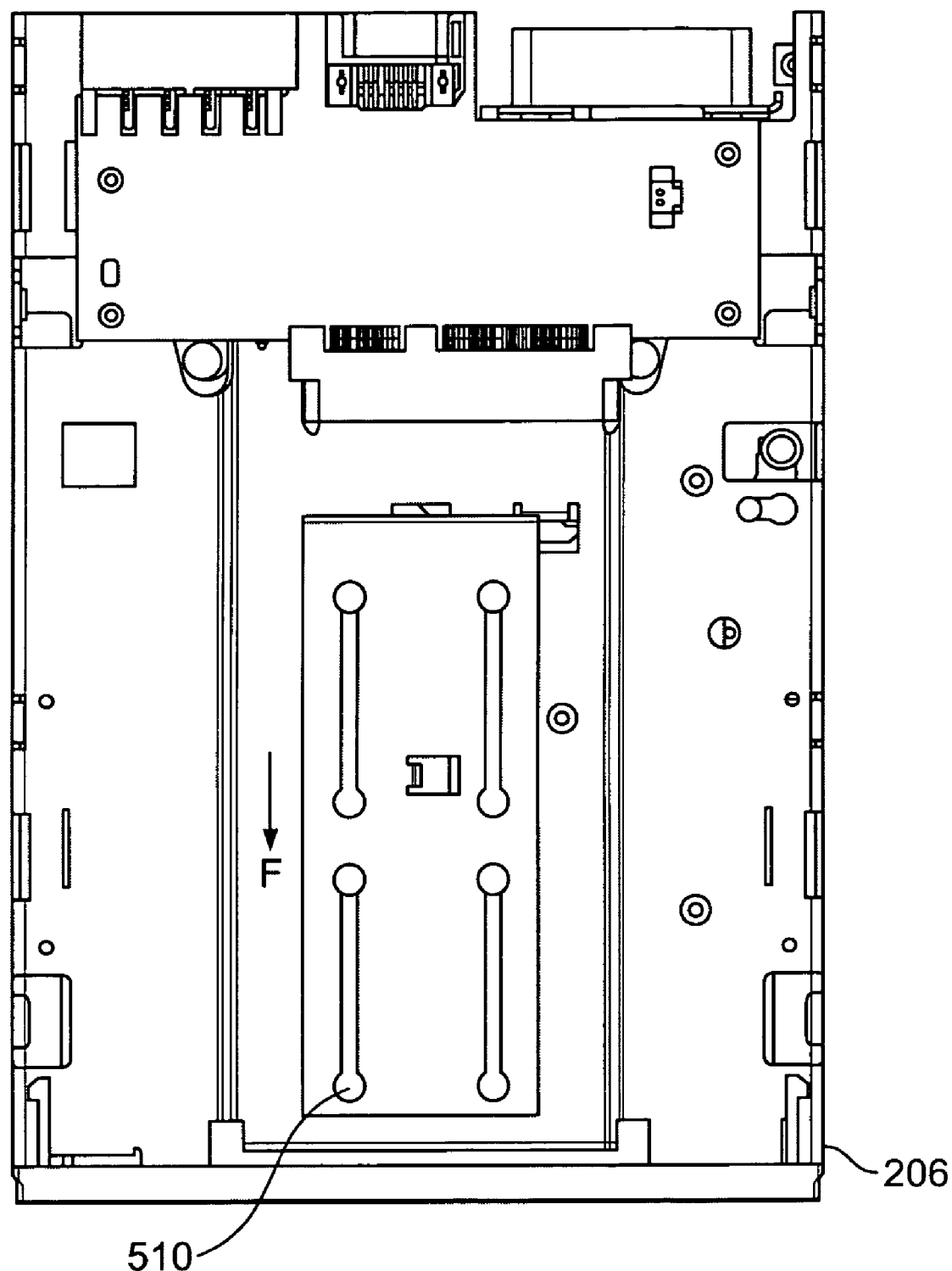
Figure 8C:
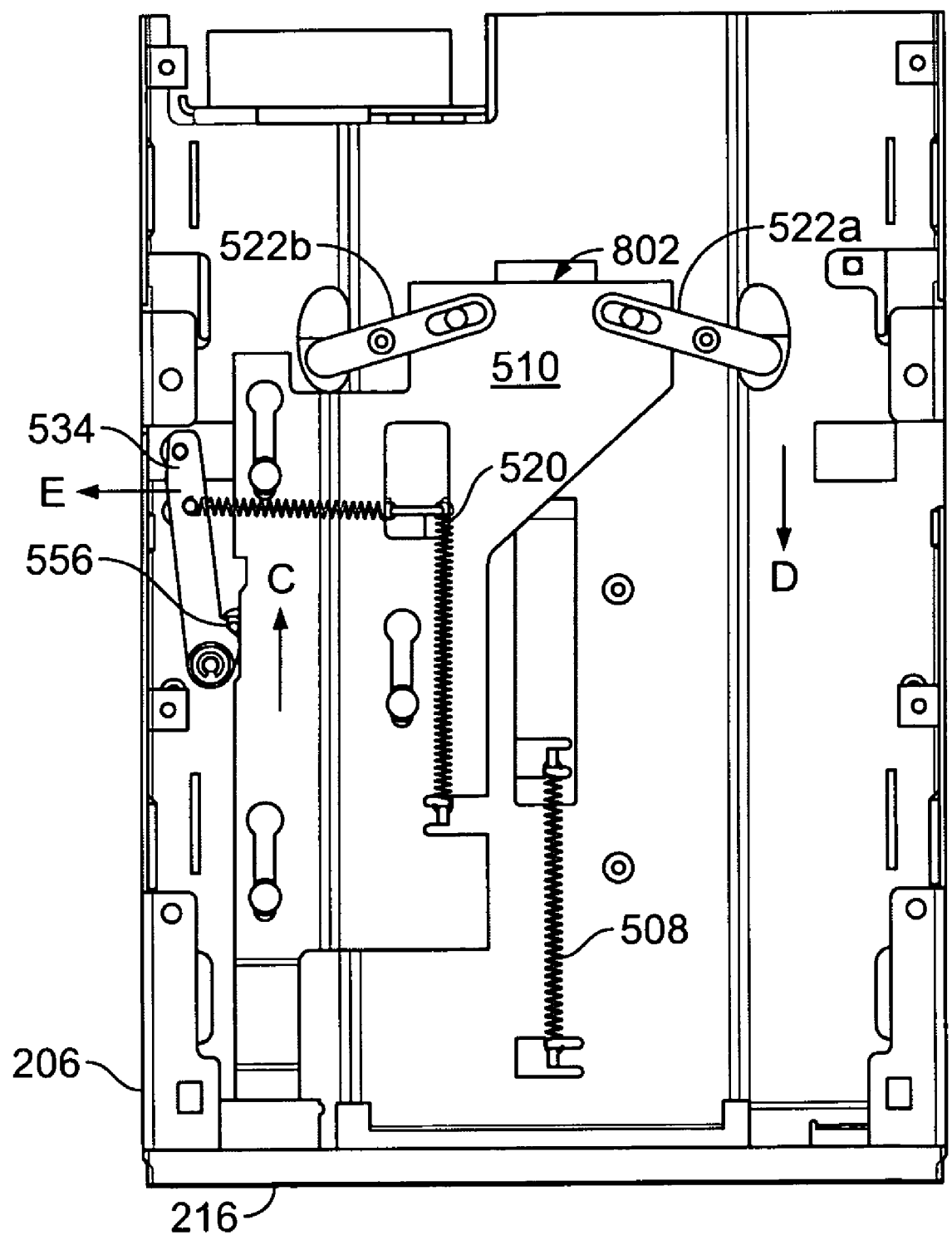

FIGS. 8A-8C illustrates an embodiment of the carrier when not in use. FIG. 8B illustrates the top surface 308 of the base 206 and FIG. 8C illustrates the bottom surface 304 of the base 206 both without illustrating the cartridge guide for clarity. As illustrated in FIG. 8A, the cartridge 100 is to be inserted through door 208. The door 208 may be closed by spring force or any other alternative means.

The spring plate 500 is positioned forward in the direction of arrow F by spring force from extension spring 508 as illustrated in FIG. 8B. In FIG. 8C, the slider plate 510 is pulled rearward in the direction of arrow C by spring force via extension spring 520. The slider plate 510 is pulled back until it meets with limit tab 802 extending outwardly from the base 206. This causes the eject button 216 to be flush against the opening assembly 210 surface. The kick-out levers 522a, 522b are pulled forward in the direction of arrow D by the position of the slider plate 510. The lever assembly 534 is spring loaded and held outward in the direction of arrow E against the cam surface notch 556 along the side of the slider plate 510.

Figure 9A:
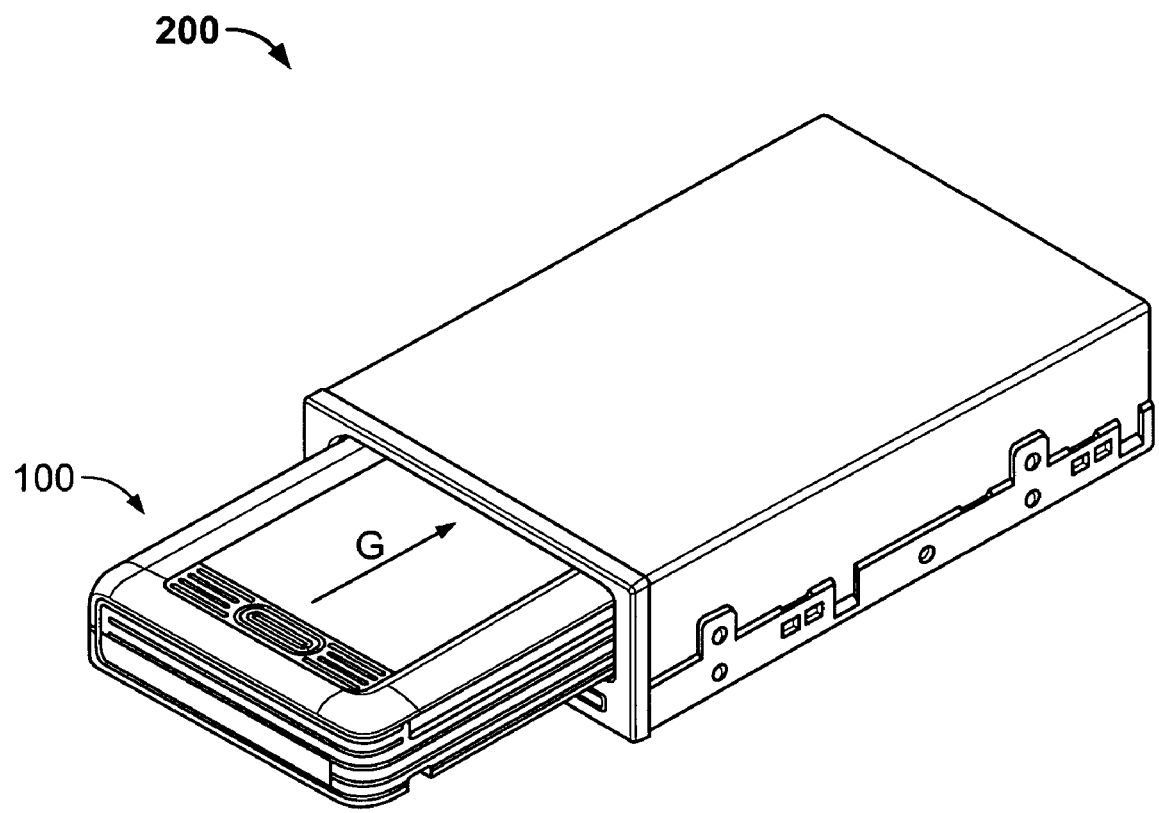
FIGS. 9A-9E illustrates a method for insertion of a cartridge into the carrier.
Figure 9B:
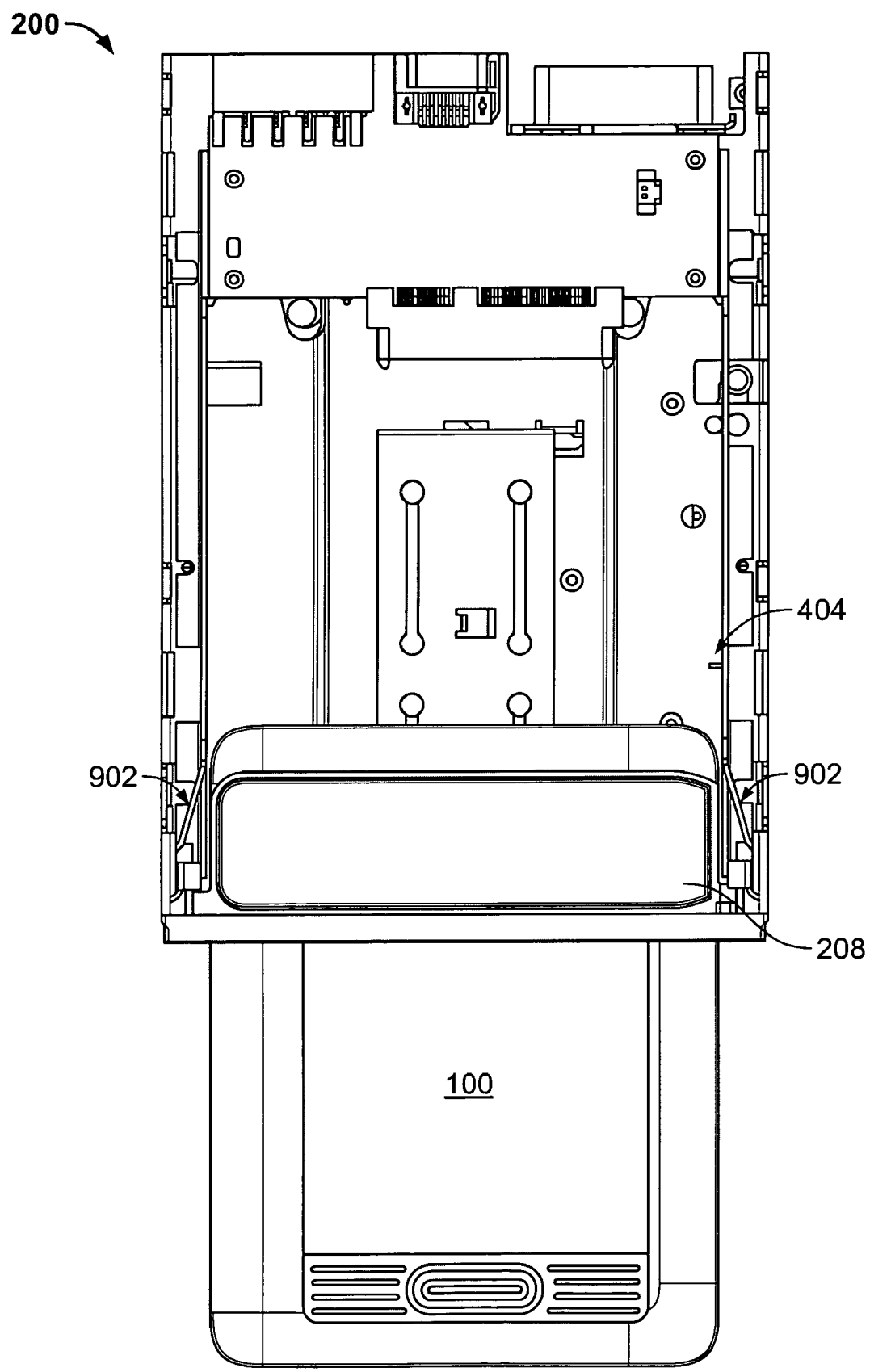

FIGS. 9A-9E illustrate a method for inserting a cartridge into the carrier. In FIG. 9A, the cartridge 100 is inserted by hand or robot, in the correct orientation, in the direction of arrow G into the carrier 200. Improper insertion of the cartridge 100 may be prevented through the contour of the opening assembly 210 and orientation tab 404 illustrated in FIG. 9B. As the cartridge 100 is inserted into the carrier 200, the door 208 flips up and the edges of the cartridge 100 and the guiding angles 902 allow for smooth insertion of the cartridge 100 into the carrier 200.

Figure 9C:
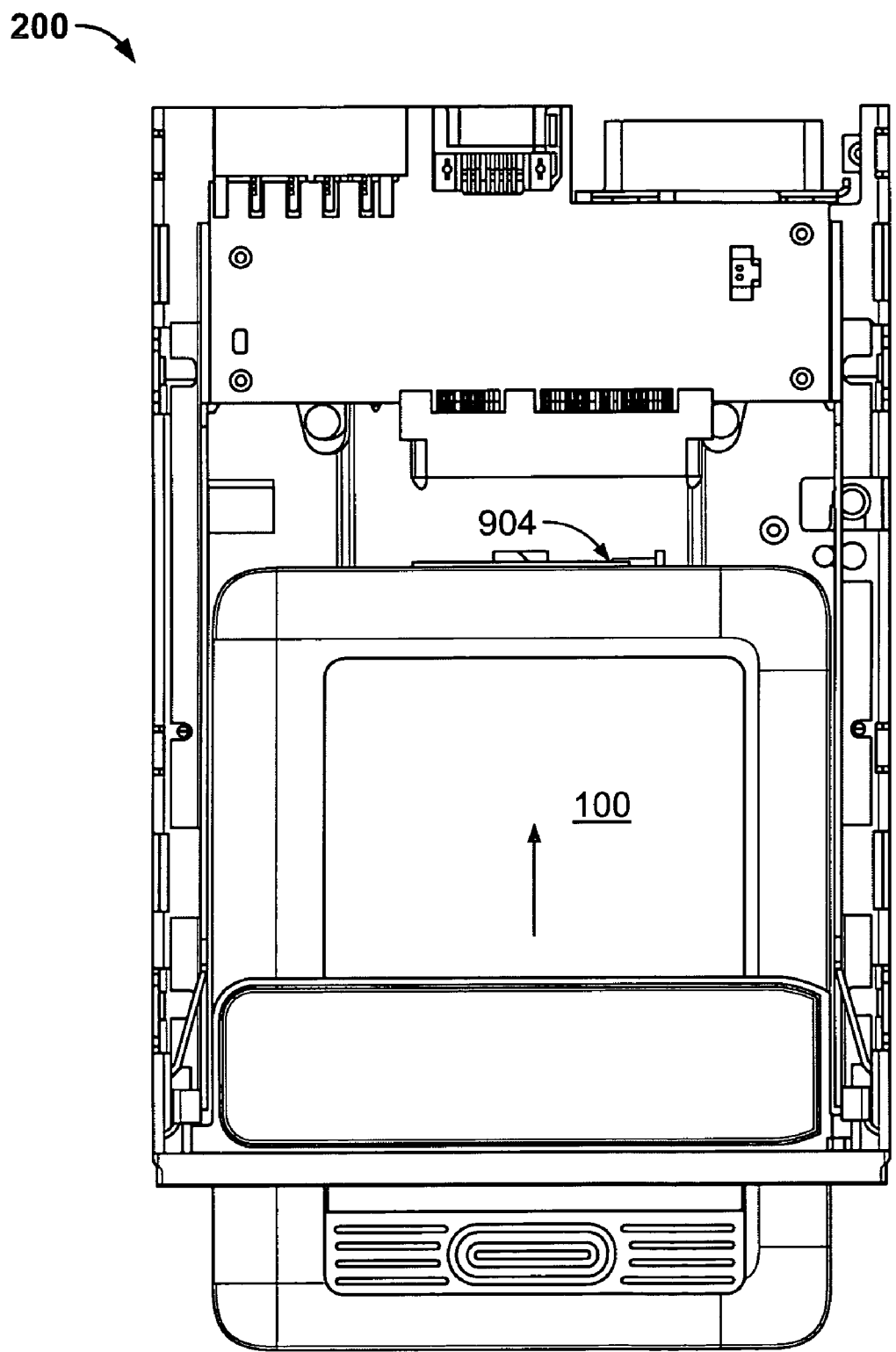

FIG. 9C illustrates the cartridge 100 inserted into the carrier 200 further in time. At approximately three quarters of insertion of the cartridge 100, the cartridge 100 contacts the spring plate 500 at contact member 904. Further insertion of the cartridge 100 will increase the load of insertion on the user or robot as the spring plate extension spring is deflected.

Figure 9D:
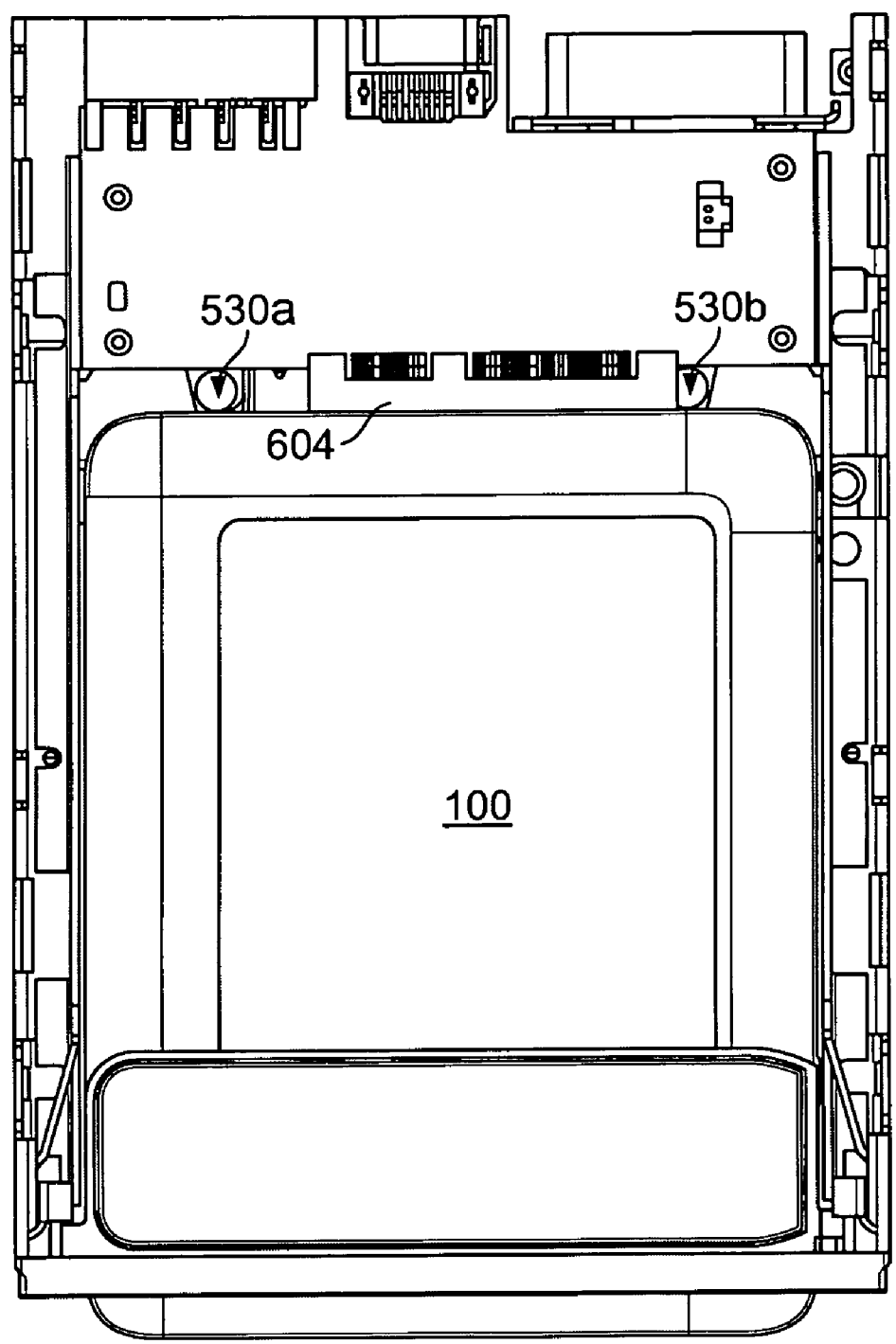
Figure 9E:
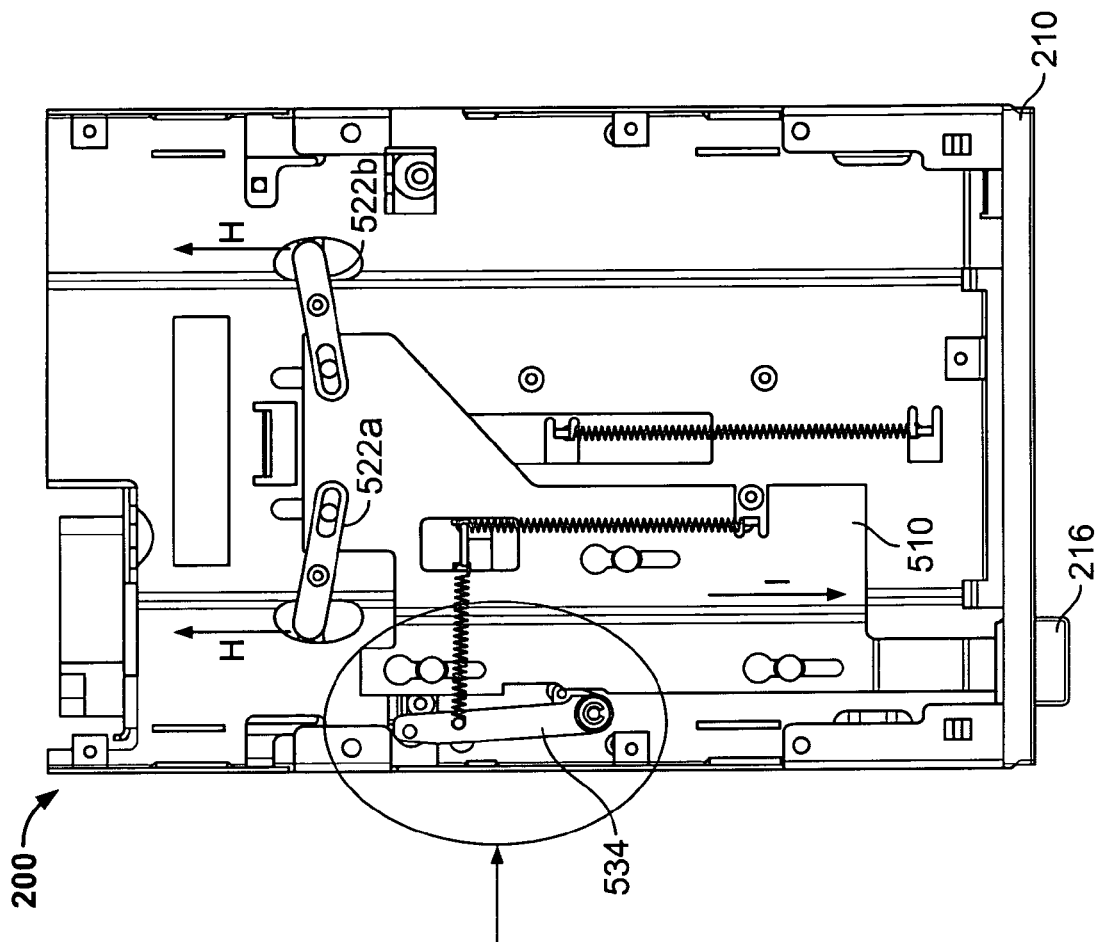
Figure 9E:
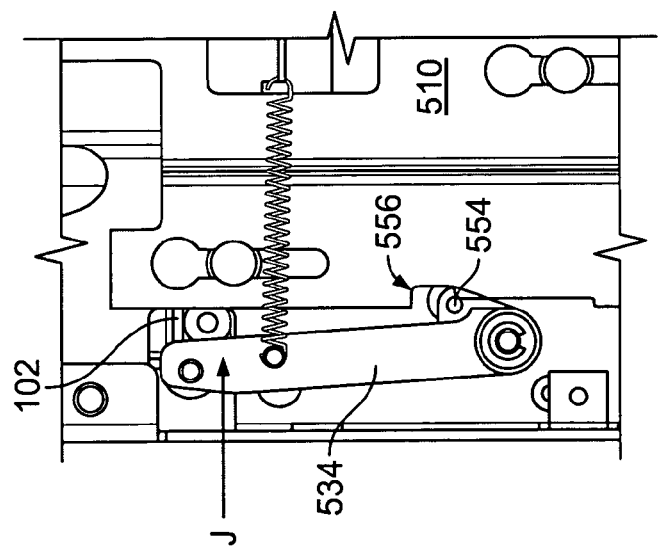

As the cartridge 100 is still further inserted into the carrier 200, as illustrated in FIGS. 9D (top view) and 9E (bottom view of base), at approximately the last 5 mm of cartridge 100 insertion, the interposer board SATA connector 604 mates with the cartridge 100. The cartridge 100 also contacts the extension members 530a, 530b of kick-out levers 522a, 522b. This causes the kick-out levers 522a, 522b to move in the direction of arrow H (FIG. 9E) which in turn causes the slider plate 510 to move forward in the direction of arrow I. As the slider plate 510 moves forward, the eject button 216 begins to protrude outwardly from the opening assembly 210. At the same time, the latch assembly 534 moves in the direction of arrow J. Follower pin 554 slides within the cam surface notch 556 on the slider plate 510 as the slider plate 510 moves forward. This causes latch assembly 534 to move in the direction of arrow J. As the cartridge 100 is further inserted into the carrier and the latch assembly 534 continues to move, roller 548 contacts the cartridge notch 102 whereby any audible clicking sound may be heard. This sound indicates that cartridge 100 is fully inserted into the carrier 200.

Once fully inserted, the cartridge 100 is flushed against the opening assembly and the eject button 216 protrudes from the opening assembly. The distance the eject button 216 protrudes outwardly from the opening assembly may be related to the ratio between the pivot point of the kick-out lever and the contact points. The cartridge may be held in position through the strong mating forces of the SATA connections and the lever assembly roller mating with the cartridge notch. Upon connection of the SATA connectors, the fan and the LED may automatically turn on and disc drive activity may turn on the LED. However, it may be appreciated that operation of the LED and fan may be modified depending upon the user. For example, the fan could be controlled to rotate only during long periods of drive activity, upon activation by a circuitry with a temperature sensor, and the like.

To eject the cartridge, the user must push the eject button inward. The eject button translates the slider plate rearward which in turn pivots the kick-out levers forward. The kick-out levers contact the cartridge symmetrically about the center of the cartridge to provide equally balanced forces in the direction of the cartridge movement. The kick-out levers remain in contact with the cartridge until after approximately 5 mm, which may be equivalent to the distance of the SATA connectors. The rollers of the lever assembly is forced outward by either the cartridge notch radius or the cam surface notch on the slider plate or both. The spring plate pushes the cartridge out of the carrier to a distance of about 15-30 mm. The cartridge may then be extracted from the carrier and the door closes by spring force.

Figure 10A:
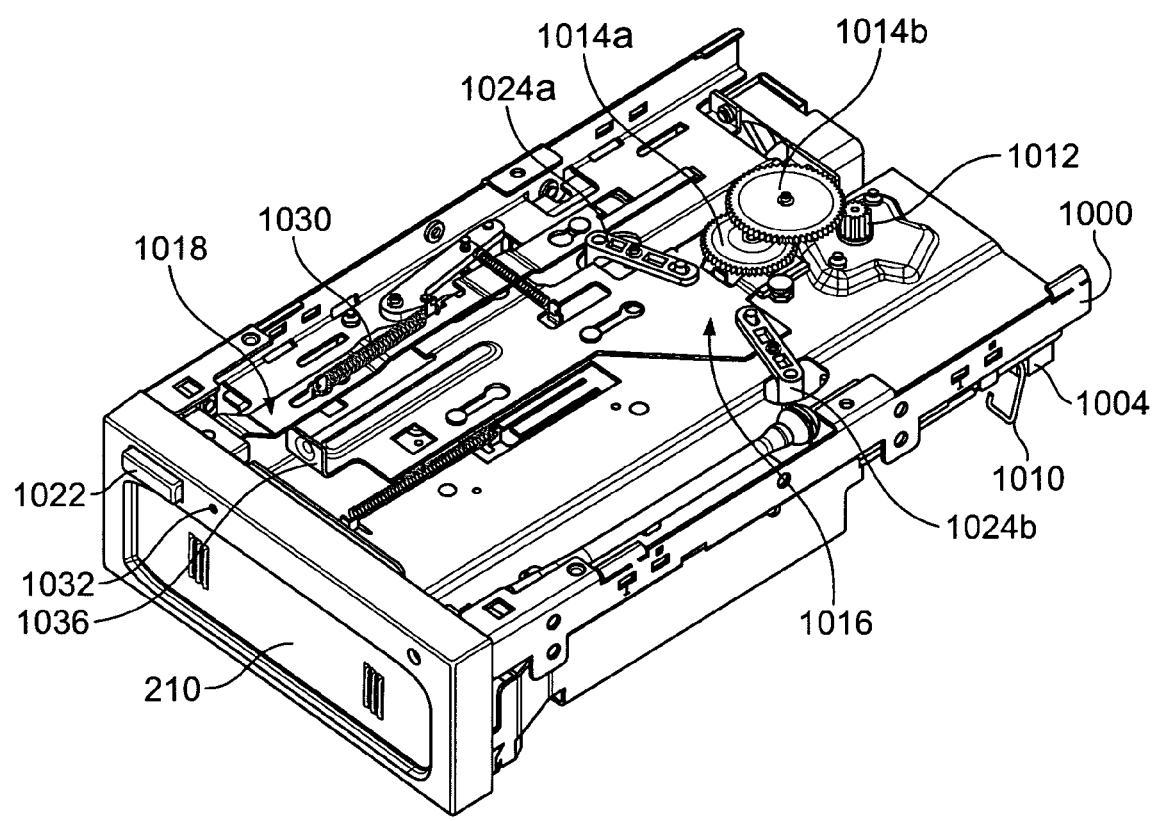
FIGS. 10A-10D illustrate yet another embodiment of an ejection mechanism.
Figure 10B:
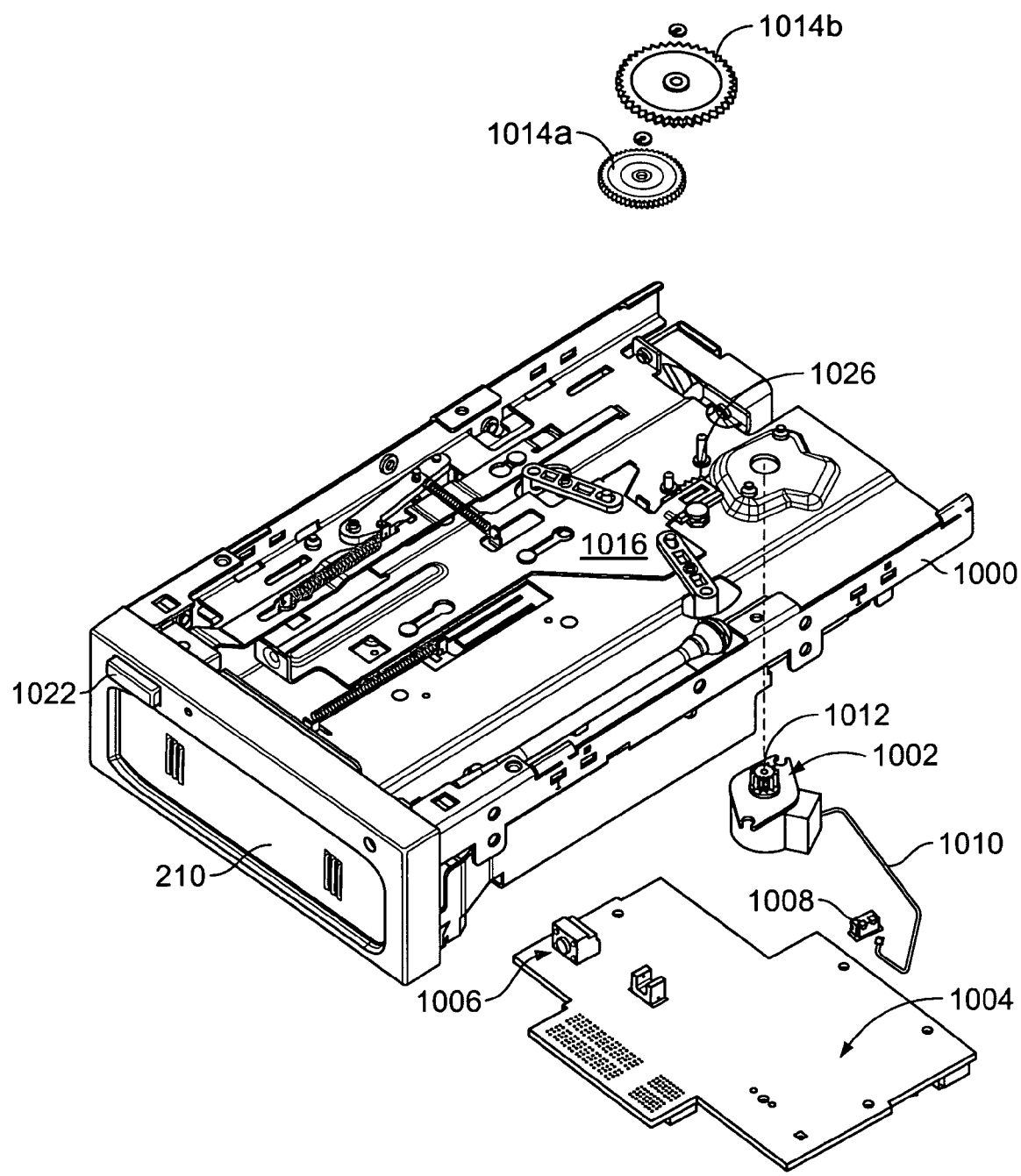

FIGS. 10A-10D illustrate yet another embodiment of an ejection mechanism. The eject mechanism illustrated in FIG. 10A may utilize a motor to eject the cartridge from the carrier rather than physical force from the user as with the ejection mechanism described above in FIGS. 5A-5E. As illustrated in FIG. 10B, a motor 1002 may be electrically connected to an enhanced PCB 1004. The enhanced PCB 1004 may have an eject switch 1006, a microprocessor 1008, and a motor controller 1010. When the eject switch 1006 is activated, it sends a signal to the microprocessor 1008, which sends a signal to the motor 1002 through the motor controller 1010.

The enhanced PCB 1004 may be positioned on top of the base 1000, similar to the position of PCB 600 illustrated in FIG. 6A. The motor pinion 1012 extends below the base 1000 and is connected to reduction gears 1014a, 1014b. The reduction gears 1014a, 1014b may be the same diameter or may have different diameters as illustrated and are positioned at the bottom surface of the base 1000.

Figure 10C:
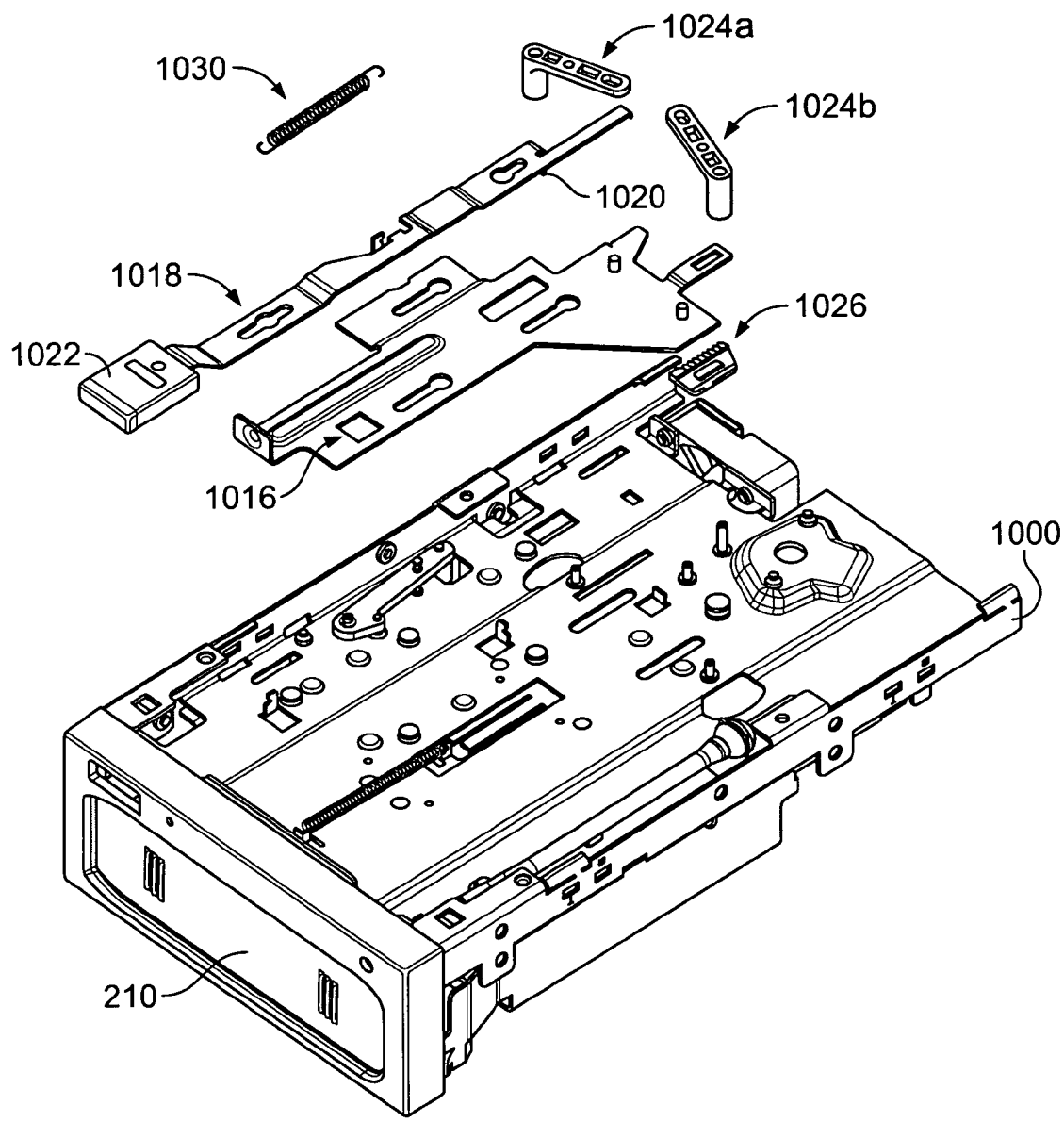

As illustrated in FIG. 10C, a button bar 1018 is separate from the slider plate 1016 to not interfere with the slider plate 1016 and kick-out levers 1024a, 1024b. The function of the slider plate 1016 is similar to the function of the slider plate 510 illustrated in FIG. 5B. The slider plate 1016 may be positioned on the bottom surface of the base 1000 and assists insertion and ejection of the cartridge from the carrier with the use of the motor as will be described in detail below.

The button bar 1018 has a switch tab 1020 which activates the eject switch 1006 when the button 1022 is pushed by the user. When positioned on the base 1000, the switch tab 1020 extends upwardly from the base 1000 to activate the eject switch 1006 on the PCB 1004. Button bar spring 1030 may be used to keep button bar 1018 from contacting the eject switch 1006. Thus, button 1022 is positioned to extend outwardly from opening assembly 210.

A gear rack 1026 may be connected at the end of the slider plate 1016 to mate with reduction gear 1014a. The gear rack 1026 may have a plurality of teeth to engage reduction gear 1014a. This connection will allow slider plate 1016 to move when reduction gears 1014a, 1014b move in response to a signal sent by ejection switch 1006.

Figure 10D:
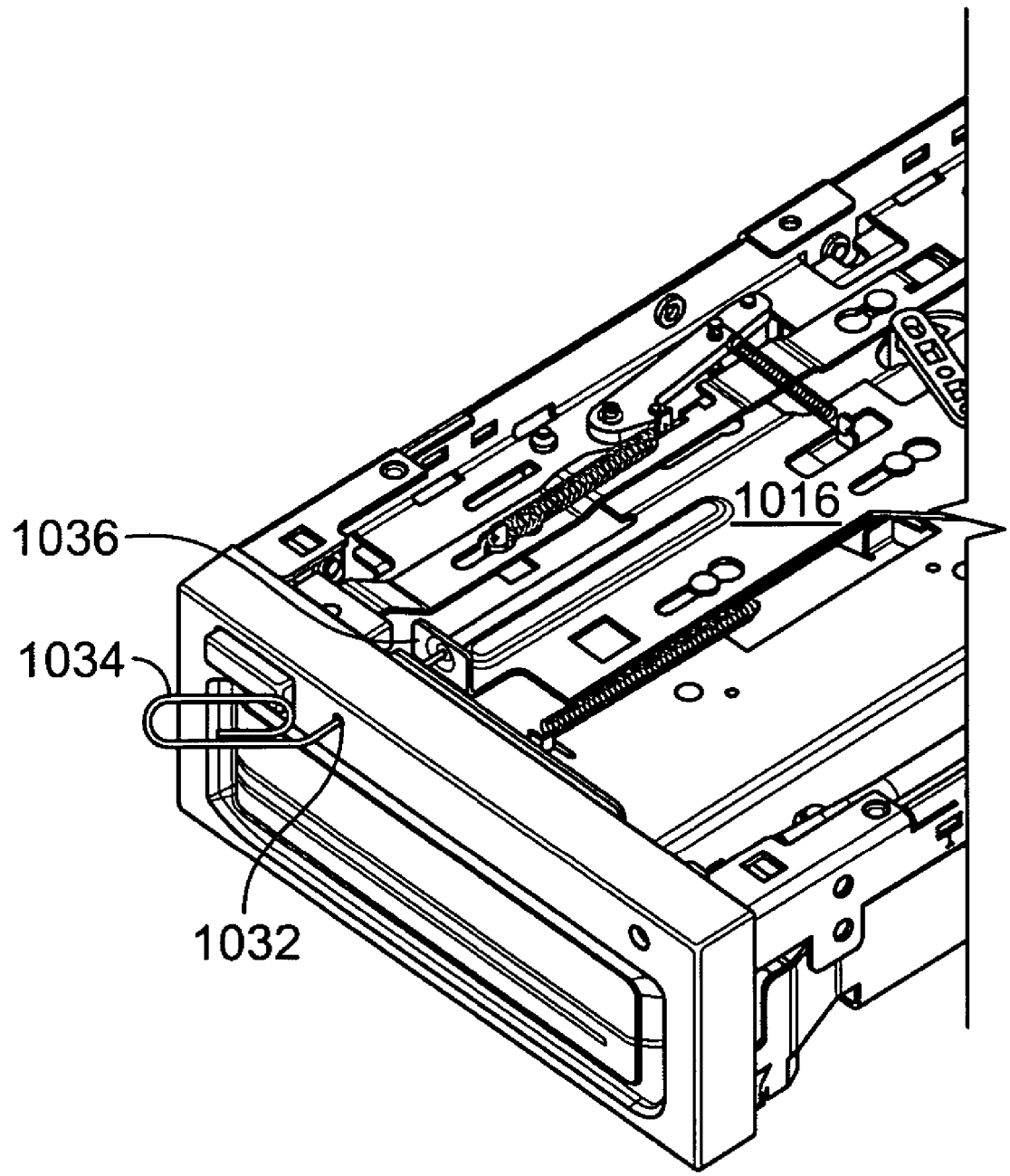

As illustrated in FIG. 10D, an emergency eject aperture 1032 may be used to eject the cartridge in case of a power outage or defect. A user may insert a small object, such as a paper clip 1034, into the emergency eject aperture 1032 to contact an emergency tab 1036 on the slider plate 1016. This causes the slider plate 1016 to eject the cartridge as described above with the manual ejection mechanism.

Microprocessor 1008 may determine when it is safe to eject the cartridge. Often times, data moves between the carrier and the hard drive inside the cartridge. Data corruption may occur if the connection is broken while data is being transmitted. The microprocessor 1008 may prevent or delay ejection of the cartridge until a safe mode is established to prevent data corruption. Additionally, a user may accidentally press button 1022 thereby causing an unwanted eject of the cartridge. To prevent accidental ejection of the cartridge, a timing program may be incorporated in microprocessor 1008. The timing program may require that the user hold the button 1022 for a specified period of time (for example, more than two seconds) before the cartridge will eject.

Figure 11:
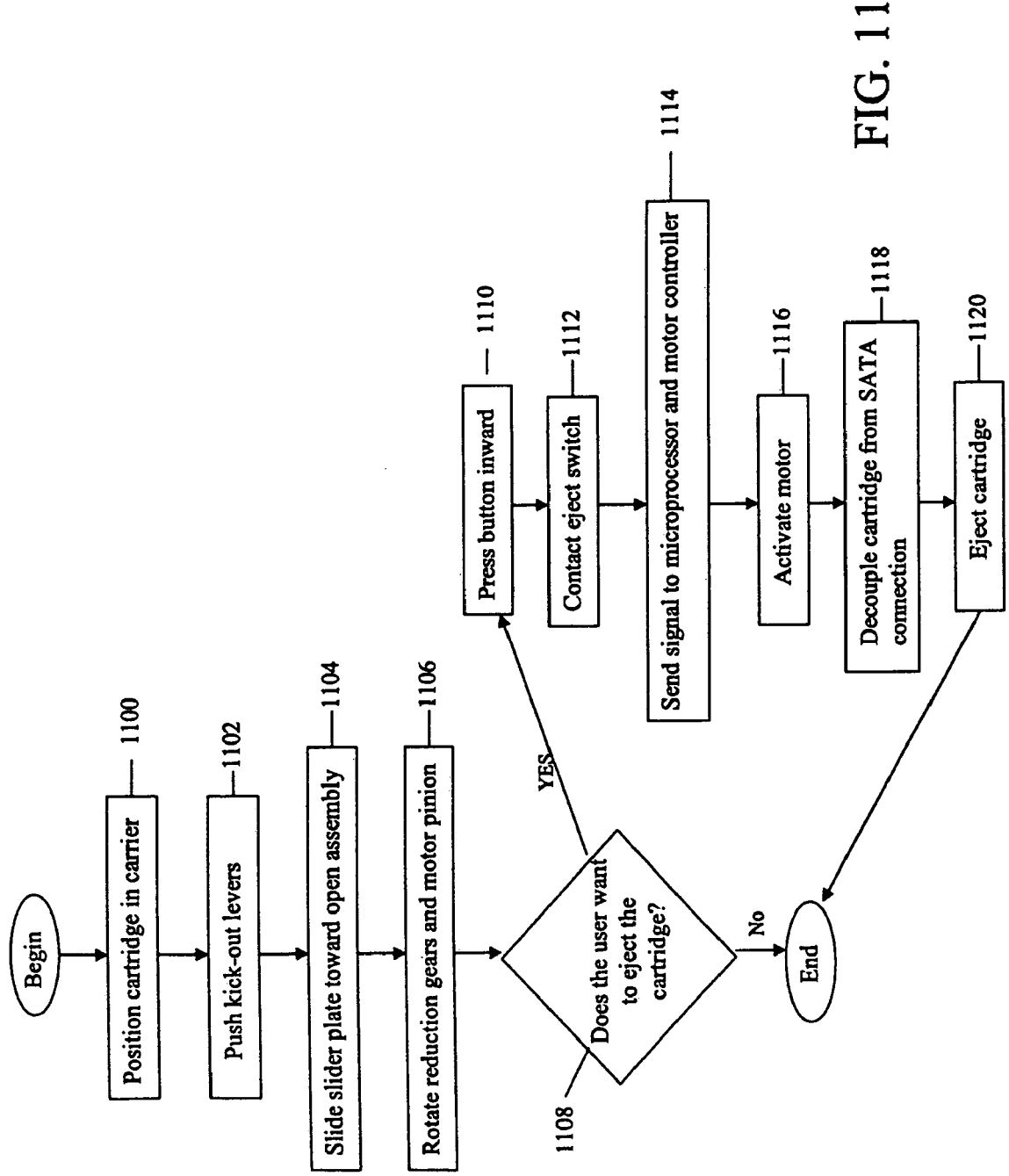
FIG. 11 is a block diagram illustrating a method for using the motor ejection mechanism.

FIG. 11 is a block diagram illustrating a method for using the motor ejection mechanism. In use, as similarly described above, the cartridge is positioned within the carrier at 1100. the cartridge pushes against kick-out levers at 1102 which in turn moves the slider plate toward the open assembly 1104. The slider plate movement causes gear rack to also move toward open assembly which in turn causes a slight rotation in reduction gears and motor pinion at 1106.

To eject the cartridge at 1108, a user may press button inward at 1110 to cause switch tab to contact the eject switch at 1112. Eject switch then sends a signal to microprocessor which sends a signal to motor controller at 1114 to activate the motor at 1116. Motor causes reduction gears to rotate enough to decouple the cartridge from the SATA connection at 1118. The cartridge is then ejected at 1120 as described above with the manual ejection mechanism.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. An apparatus to load and eject a cartridge, comprising:
   a base having a recessed plate, a top surface, and a bottom surface;
   an interposer board coupled to the base at the top surface;
   a motorized eject mechanism coupled to the interposer board and the base including:
      an eject switch, the elect switch contacted by a switch tab;
      a microprocessor electrically coupled to the eject switch to receive a signal from the eject switch;
      a motor controller coupled to the microprocessor to receive a signal from the microprocessor;
      a motor coupled to the motor controller, the motor shaft serving as the axle of a motor pinion gear;
      at least one reduction gear coupled to the motor pinion;
      a gear rack coupled to the at least one reduction gear;
      a slider plate coupled to the base at the bottom surface and the gear rack; and
      a button bar coupled to the base at the bottom surface, the button bar having a switch tab to contact the motorized eject mechanism.

2. The apparatus of claim 1 further comprising a guide coupled to the top surface of the base to receive the cartridge.

3. The apparatus of claim 1 further comprising a top cover and a bottom cover coupled to the base to form an enclosure.

4. The apparatus of claim 3 further comprising an opening to provide access to the enclosure.

5. The apparatus of claim 1 further comprising a button spring bar coupled to the button bar and the base.

6. The apparatus of claim 1 wherein said slider plate further comprises an emergency tab.

7. A motorized eject mechanism, comprising:
   a base having a recessed plate, a top surface, and a bottom surface;
   an interposer board coupled to the base of the top surface;
   an eject switch coupled to the interposer board, the eject switch contacted by a switch tab;
   a microprocessor electrically coupled to the eject switch to receive a signal from the eject switch;

a motor controller coupled to the microprocessor to receive a signal from the microprocessor;
a motor coupled to the motor controller, the motor driving a motor pinion gear;
at least one reduction gear coupled to the motor pinion;
a gear rack coupled to the at least one reduction gear; and
a slider plate coupled to the base at the bottom surface and the gear rack.

8. The apparatus of claim 7 further comprising a button bar coupled to the base at the bottom surface, the button bar having a switch tab to contact the eject switch.

9. A motorized eject mechanism comprising:
a base having a recessed plate, a top surface, and a bottom surface;
an interposer board coupled to the base of the top surface;
an eject switch coupled to the interposer board, the elect switch contacted by a switch tab;
a microprocessor electrically coupled to the elect switch to receive a signal from the eject switch;
a motor controller coupled to the microprocessor to receive a signal from the microprocessor;
a motor coupled to the motor controller, the motor driving a motor pinion a gear rack coupled to the at least one reduction gear, and
a slider plate coupled to the base at the bottom surface and the gear rack, wherein said slider plate further comprises an emergency tab.

* * * * *